US010612813B2

(12) United States Patent
Hollender et al.

(10) Patent No.: US 10,612,813 B2
(45) Date of Patent: Apr. 7, 2020

(54) MOTORIZED GEAR AND COUPLING SYSTEM

(75) Inventors: John E. Hollender, Chicago, IL (US); Keith Alsberg, Chicago, IL (US); Michael Blaha, Chicago, IL (US)

(73) Assignee: Metropolitan Air Technology, Chicago, IL (US)

(*) Notice: Subject to any disclaimer, the term of this patent is extended or adjusted under 35 U.S.C. 154(b) by 1588 days.

(21) Appl. No.: 12/383,018

(22) Filed: Mar. 19, 2009

(65) Prior Publication Data

US 2009/0181611 A1 Jul. 16, 2009

Related U.S. Application Data

(63) Continuation-in-part of application No. 12/287,542, filed on Oct. 10, 2008, now abandoned, which is a
(Continued)

(51) Int. Cl.
*F24F 13/14* (2006.01)
*F24F 11/30* (2018.01)
(Continued)

(52) U.S. Cl.
CPC .......... *F24F 13/1426* (2013.01); *F24F 11/30* (2018.01); *F16H 1/16* (2013.01); *F24F 13/15* (2013.01); *F24F 2140/40* (2018.01)

(58) Field of Classification Search
CPC ........ F24F 13/1426; F24F 13/14; F24F 13/15; F24F 11/30; F24F 2140/40; F16H 1/16
(Continued)

(56) References Cited

U.S. PATENT DOCUMENTS 2,907,976 A 10/1959 Damon
3,168,366 A 2/1965 Fuller
(Continued)

OTHER PUBLICATIONS

Metropolitan Air Technology RT-WGA Spec Sheet (2005), accessed at "http://web.archive.org/web/20060516104457/http://www.metairtech.com/products_rtwga_spec.htm".

*Primary Examiner* — Gregory L Huson
*Assistant Examiner* — Dana K Tighe
(74) *Attorney, Agent, or Firm* — Ice Miller LLP

(57) ABSTRACT

A system for controlling airflow in a plenum, that comprises a worm gear and planetary gear that are removably coupled to a worm shaft and planetary shaft, respectively. The planetary shaft controls the movement of a damper between an open position permitting maximum airflow through the plenum, and a closed position restricting airflow through the plenum. A motor or gear-motor is positioned at the plenum for driving the worm shaft. The motor is controlled by a remotely located controller that includes a power supply for operating the motor and that has a display providing a continuous indication of the position of the damper between the open and closed positions. The controller is connected to the motor through a cable with a detachable electrical connection between the cable and the controller, such as a jack and plug. A wall plate for housing the electrical connection is mounted on a wall or other structure. The wall plate has a first plate for housing the jack and a second plate with a flexible flange for removably securing the jack in the housing by snap fit insertion.

21 Claims, 16 Drawing Sheets

Related U.S. Application Data continuation-in-part of application No. 12/080,007, filed on Mar. 31, 2008, now abandoned, which is a continuation-in-part of application No. 11/974,302, filed on Oct. 12, 2007, now abandoned.

(51) Int. Cl.
- *F24F 13/15* (2006.01)
- *F16H 1/16* (2006.01)
- *F24F 140/40* (2018.01)

(58) Field of Classification Search
USPC .............. 454/333, 339, 254, 131; 439/131
See application file for complete search history.

(56) References Cited

U.S. PATENT DOCUMENTS

| | | | | |
|---|---|---|---|---|
| 3,239,791 | A | 3/1966 | Fyrk | |
| 3,590,653 | A | 7/1971 | Dreckmann et al. | |
| 3,716,815 | A * | 2/1973 | Riches | 439/142 |
| 3,784,962 | A | 1/1974 | Byrd | |
| 3,824,524 | A | 7/1974 | Glover | |
| 3,986,765 | A | 10/1976 | Shaffer et al. | |
| 4,217,030 | A | 8/1980 | Howarth | |
| 4,359,619 | A | 11/1982 | Bergoltz | |
| 4,361,308 | A | 11/1982 | Buss | |
| 4,389,021 | A | 6/1983 | Coldren | |
| 4,420,208 | A | 12/1983 | Holland et al. | |
| 4,449,664 | A | 5/1984 | Mithuhira et al. | |
| 4,451,103 | A | 5/1984 | Buresh et al. | |
| 4,545,363 | A | 10/1985 | Barchechat et al. | |
| 4,703,508 | A | 10/1987 | Umezu | |
| 4,723,481 | A | 2/1988 | Hart et al. | |
| 4,836,804 | A | 6/1989 | London et al. | |
| 4,936,794 | A | 6/1990 | Shaw et al. | |
| 5,151,063 | A * | 9/1992 | Tanaka et al. | 454/258 |
| 5,311,451 | A | 5/1994 | Barrett | |
| 5,328,388 | A * | 7/1994 | Fust et al. | 439/544 |
| 5,453,019 | A * | 9/1995 | Garver et al. | 439/188 |
| 5,533,668 | A | 7/1996 | Erikson | |
| 5,594,202 | A | 1/1997 | Tobias | |
| 5,651,696 | A | 7/1997 | Jennison | |
| 5,702,298 | A | 12/1997 | Conkling | |
| 6,572,413 | B2 * | 6/2003 | Olson et al. | 439/668 |
| 6,717,299 | B2 | 4/2004 | Bacile et al. | |
| 6,805,580 | B2 * | 10/2004 | Piedmont | 439/516 |
| 6,939,161 | B1 | 9/2005 | Yi et al. | |
| 7,056,157 | B2 * | 6/2006 | Herring et al. | 439/680 |
| 7,089,958 | B2 | 8/2006 | Schlosser et al. | |
| 7,172,458 | B2 | 2/2007 | Van Der Mee et al. | |
| 7,258,280 | B2 | 8/2007 | Wolfson | |
| 7,331,852 | B2 | 2/2008 | Ezell et al. | |
| 7,344,089 | B1 * | 3/2008 | Sutterfield | 236/49.3 |
| 8,038,075 | B1 | 10/2011 | Walsh | |
| 2001/0027814 | A1 | 10/2001 | Stone et al. | |
| 2002/0117986 | A1 | 8/2002 | Becerra et al. | |
| 2002/0172467 | A1 | 11/2002 | Anderson et al. | |
| 2004/0157498 | A1 | 8/2004 | Hall et al. | |
| 2006/0134990 | A1 * | 6/2006 | Van Der Mee et al. | 439/638 |
| 2006/0151165 | A1 | 7/2006 | Poirier | |
| 2007/0063059 | A1 | 3/2007 | Votaw et al. | |
| 2008/0119073 | A1 * | 5/2008 | Thelen | 439/131 |
| 2008/0299821 | A1 | 12/2008 | Hammond et al. | |
| 2008/0318474 | A1 | 12/2008 | Crotinger et al. | |

\* cited by examiner

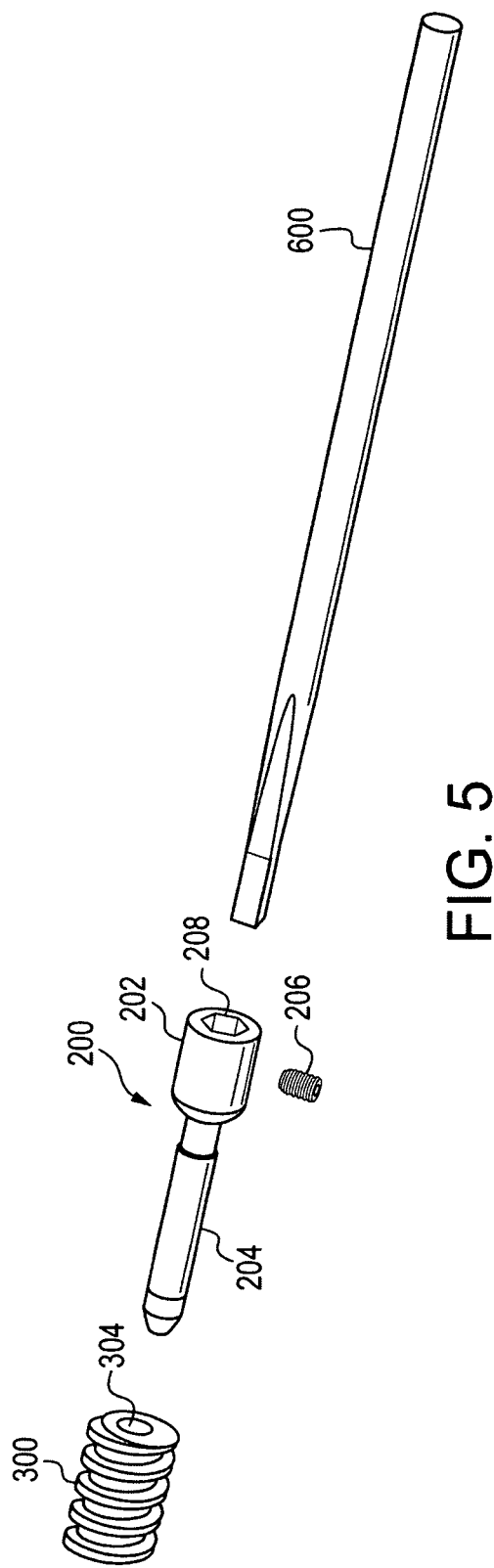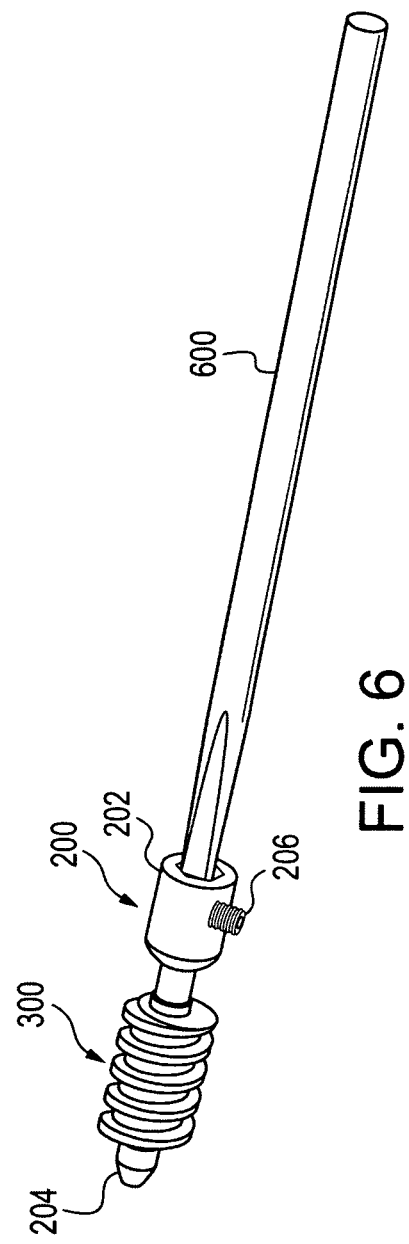

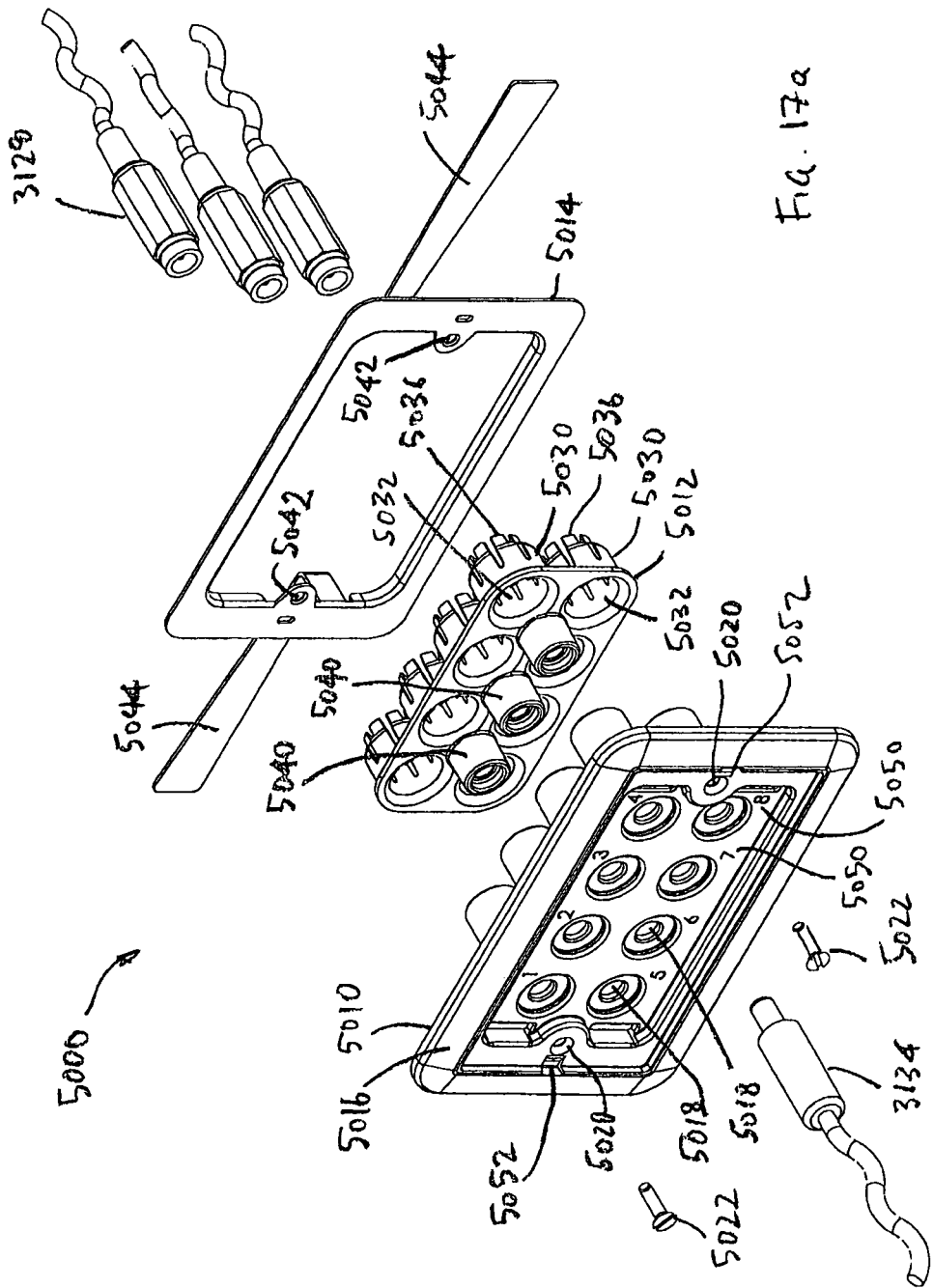

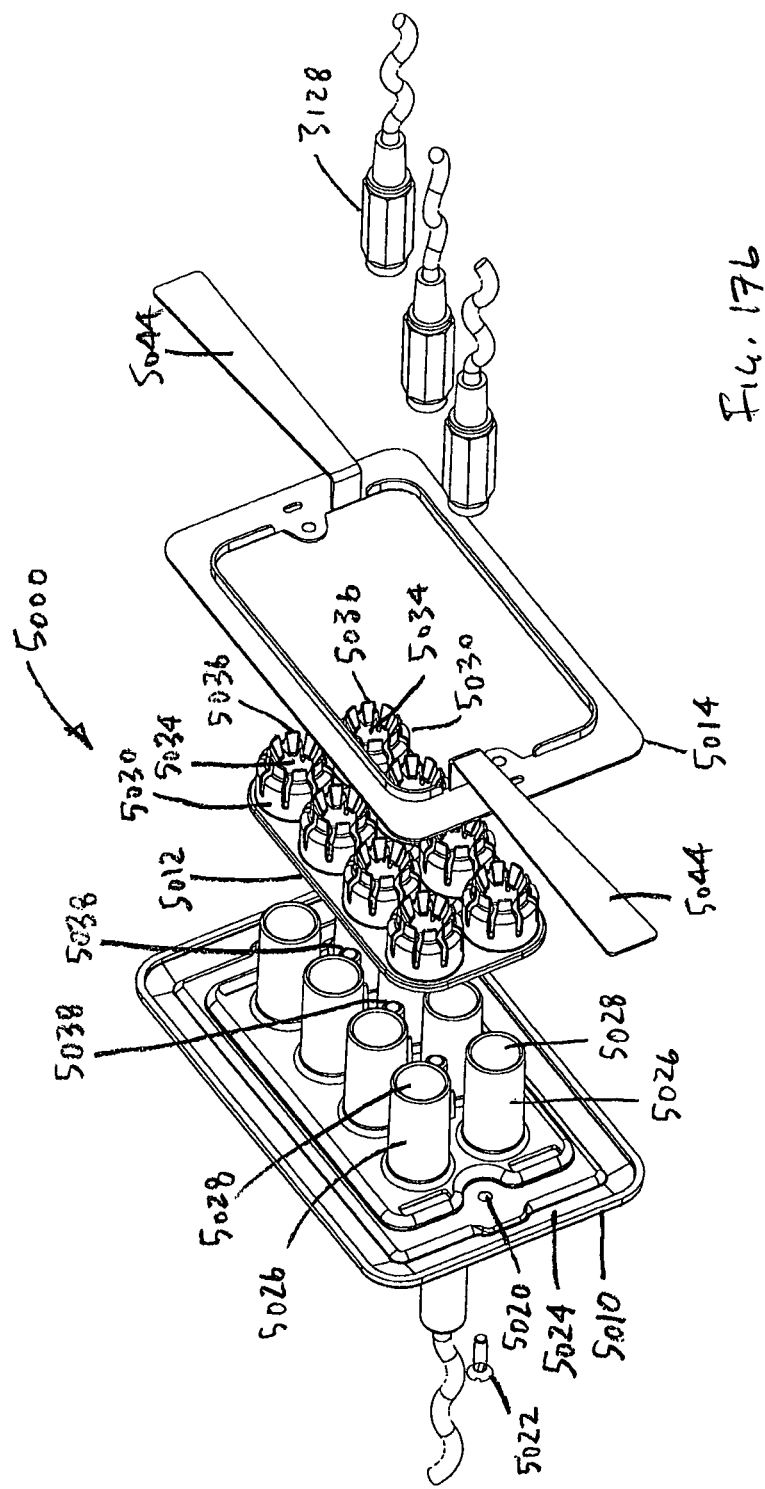

MOTORIZED GEAR AND COUPLING SYSTEM

CROSS-REFERENCE TO RELATED APPLICATIONS

This application is a continuation-in-part of U.S. patent application Ser. No. 12/287,542 filed on Oct. 10, 2008, now abandoned and entitled "MOTORIZED GEAR AND COUPLING SYSTEM," which is a continuation-in-part of U.S. patent application Ser. No. 12/080,007 filed on Mar. 31, 2008, now abandoned and entitled "MOTORIZED GEAR AND COUPLING SYSTEM," which is a continuation-in-part of U.S. patent application Ser. No. 11/974,302 filed on Oct. 12, 2007, now abandoned and entitled "GEAR AND COUPLING SYSTEM," all of which are incorporated by reference herein in their entirety.

BACKGROUND

Worm and planetary gears work together to transfer rotational movement in one plane to another plane. The worm gear and planetary gear (also commonly referred to as a worm and worm gear, respectively) are placed in rotational engagement with each other so that the threads of the worm gear mesh with the teeth of the planetary gear. Thus, the longitudinal axis of the worm gear and that of the planetary gear are at right angles with each other so that rotational movement of one gear along its longitudinal axis is transferred to the other gear along its longitudinal axis.

The worm gear/planetary gear combination may be used to transfer the rotational movement of one shaft or other body to that of another shaft or body. This may be accomplished by coupling one of the shafts to the worm gear and the other to the planetary gear. Couplings are used to couple the shafts to the gears. In general, the couplings are separate elements, such as a nut or bearing, which must be separately attached to both the shaft and the gear. For example, the shaft may be inserted into the axle of the gear and held in place with a bearing.

The shafts coupled to the worm and planetary gears may by rotated manually. However, the gears can also be rotated by a motor. Thus, either the manual or motorized motion of one shaft is translated via the worm gear/planetary gear combination to another shaft or body.

SUMMARY

A gear system comprising a gear and coupling portion including a shaft, a worm gear, a planetary gear, a motor, and a means for controlling the motor is presented. The system may be supported by a bracket. The worm gear includes a coupler (a "worm coupling") integrated with the worm gear's axle. Thus, the axle and the coupler form one integrated element. To attach a shaft (the "worm shaft") to the worm coupling and a shaft (the "planetary shaft") to the planetary gear, the worm shaft and the planetary shaft are inserted into the worm coupling and the planetary coupling, respectively. Both couplings include bores through which set screws are inserted so that they engage the shafts. Thus, the shafts are held in place. Shafts of different sizes and shapes may be accommodated by the distance by which the set screws are inserted into the couplings.

The worm coupling includes a head and an elongated portion. The elongated portion may be inserted into and fixedly attached to the worm gear. In this manner, the elongated portion serves as the axle of the worm gear. The head of the worm coupling includes an opening into which the worm shaft is inserted and to which it is removably attached. To attach the worm shaft to the worm coupling, the head may include one or more bores into which set screws may be inserted so that they contact the worm shaft. The cross-sectional shape of the coupling and the worm shaft are generally complementary.

The planetary coupling couples a shaft (the "planetary shaft") with the planetary gear. The planetary coupling includes a bore into which the planetary shaft may be inserted and to which it is removably attached. To attach the planetary shaft to the planetary coupling, the planetary coupling may include one or more bores into which set screws may be inserted so that they contact the planetary shaft. By using a multiple of bores and set screws, such as four, the planetary coupling may accommodate planetary shafts with cross-sections significantly different and/or smaller than that of the planetary coupling. The cross-sectional shape of the planetary coupling and the planetary shaft may be complementary, however, this is not necessary.

The worm shaft is coaxially connected with a motor or gear-motor that rotates the worm shaft and, consequently, the worm gear. The motor is in electromechanical communication with the controller when the controller is connected to a modular interface. For example, the motor may be direct current, low voltage, low torque, and low rpm. The controller regulates the motor, particularly by activating and deactivating the motor as well as controlling the direction and distance the motor rotates the worm shaft. The controller also powers the motor, for instance, by battery. The controller may contain a processor and/or memory. The processor may be coupled to a sensor that deactivates the motor once the motor draws a certain level of current, indicating that the mechanism has reached the end of its range of motion.

The controller may be connected to the motor by an electrical connector, such as a plug and a jack for receiving the plug. The electrical connector may be mounted remotely from the motor by a wall plate comprising a first plate having a housing sized and shaped to receive the jack and a second plate having a flexible flange for removably securing the jack in the housing.

BRIEF DESCRIPTION THE DRAWINGS

The invention can be better understood with reference to the following drawings and description. The components in the figures are not necessarily to scale, emphasis instead being placed upon illustrating the principles of the invention. In the drawings:

FIG. 5 is an exploded isometric view of the coupling, first shaft and worm gear shown in FIG. 3;

FIG. 6 is an isometric view of the coupling, first shaft and worm gear shown in FIG. 3;

FIG. 16b is an isometric view of the back side of the wall plate of FIG. 16a.

FIG. 17a is an exploded isometric view of the wall plate shown in FIG. 16a.

FIG. 17b is an exploded isometric view of the wall plate shown in FIG. 16b.

FIG. 18b is an exploded isometric view of the back side of the wall plate of FIG. 18a.

DETAILED DESCRIPTION

Figure 1:
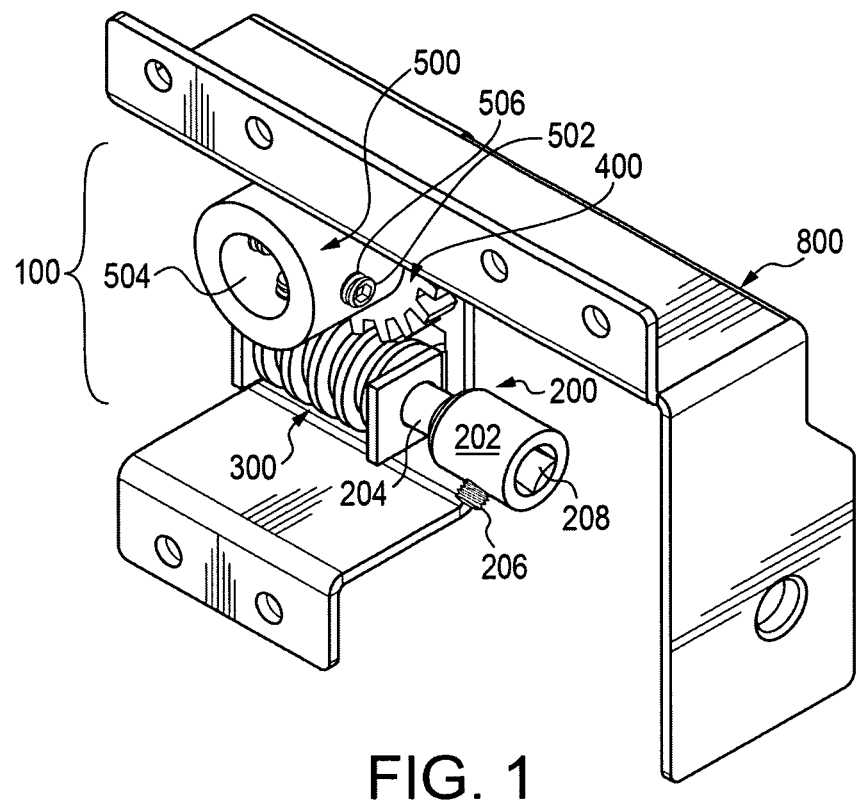
FIG. 1 is a front isometric view of a gear and coupling system mounted on a bracket.
Figure 2:
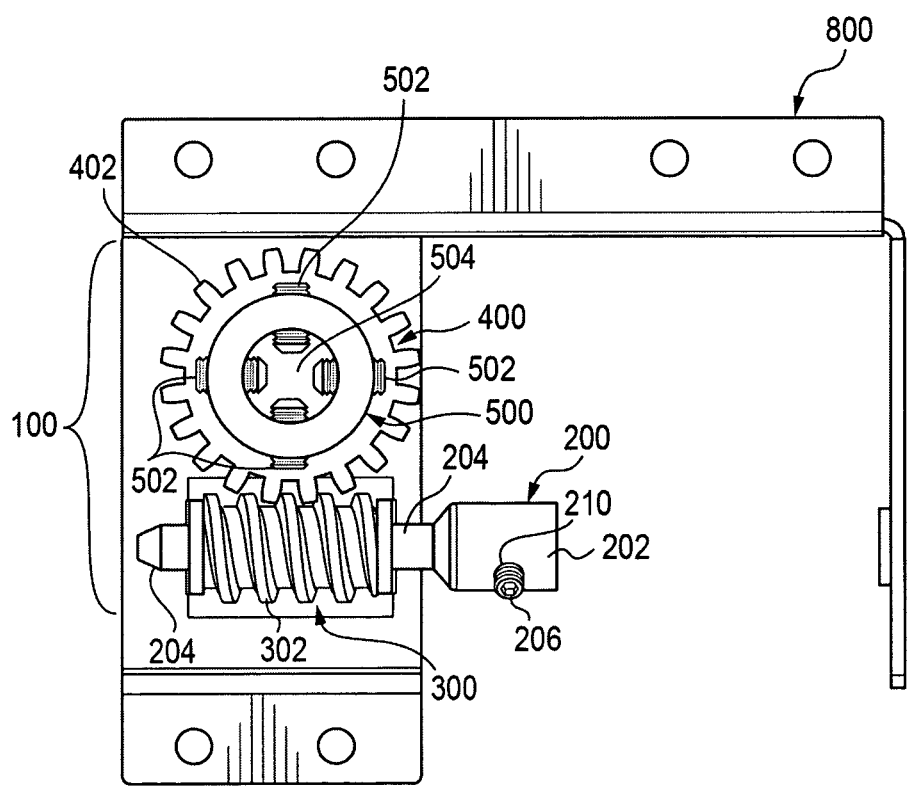
FIG. 2 is a front elevation view of the gear and coupling system mounted on a bracket shown in FIG. 1.

A gear and coupling system is shown in FIGS. 1 and 2. The system 100 generally includes a worm gear coupling 200, worm gear 300, planetary gear 400 and planetary gear coupling 500. As shown in FIGS. 1 and 2, the system 100 may be mounted on a bracket 800. The bracket 800 may include configurations that maintain the functional relationship among the elements of the system 100. The worm gear 300 and the planetary gear 400 are mounted at right angles to each other so that the threads 302 of the worm gear 300 intermesh with the teeth 402 of the planetary gear 400. In this arrangement, rotation of the worm gear 300 around its longitudinal axis will cause the planetary gear 400 to rotate around its longitudinal axis.

The worm gear coupling 200 includes a head 202 and an elongated portion 204. The worm gear 300 is coaxially attached around the elongated portion 204 along the longitudinal axis of the elongated portion 204. Thus, the elongated portion 204 serves as the axle of the worm gear 300 in one integrated element. The head 202 includes a bore 210 for receiving a set screw 206. Although one bore 210 and one set screw 206 are shown, a variety and number of bores 210 and set screws 206 may be included. The head also includes an opening 208.

The planetary gear coupling 500 is fixedly and coaxially attached to the planetary gear 400. In a preferred embodiment, planetary gear 400 and planetary gear coupling 500 are formed integrally as a single element. The planetary gear coupling 500 may include a number of bores 506 for receiving a number of set screws 502. Although four bores 506 and set screws 502 are shown in FIGS. 1 and 2, a variety and number of bores 506 and set screws 502 may be included.

Worm gear coupling 200, worm gear 300, planetary gear 400 and planetary gear coupling 500 may be formed of various materials that are known in the art, including metal and plastic. In a preferred embodiment, worm gear coupling 200 and worm gear 300 (and/or planetary gear 400 and planetary gear coupling 500) are integral and formed as a single element. Worm gear coupling 200, worm gear 300, planetary gear 400 and/or planetary gear coupling 500 may be made of various materials that are known in the art, including metal, nylon or acetal resin, and may be formed by milling, casting, molding or other methods known in the art that are appropriate to the material.

Figure 3:
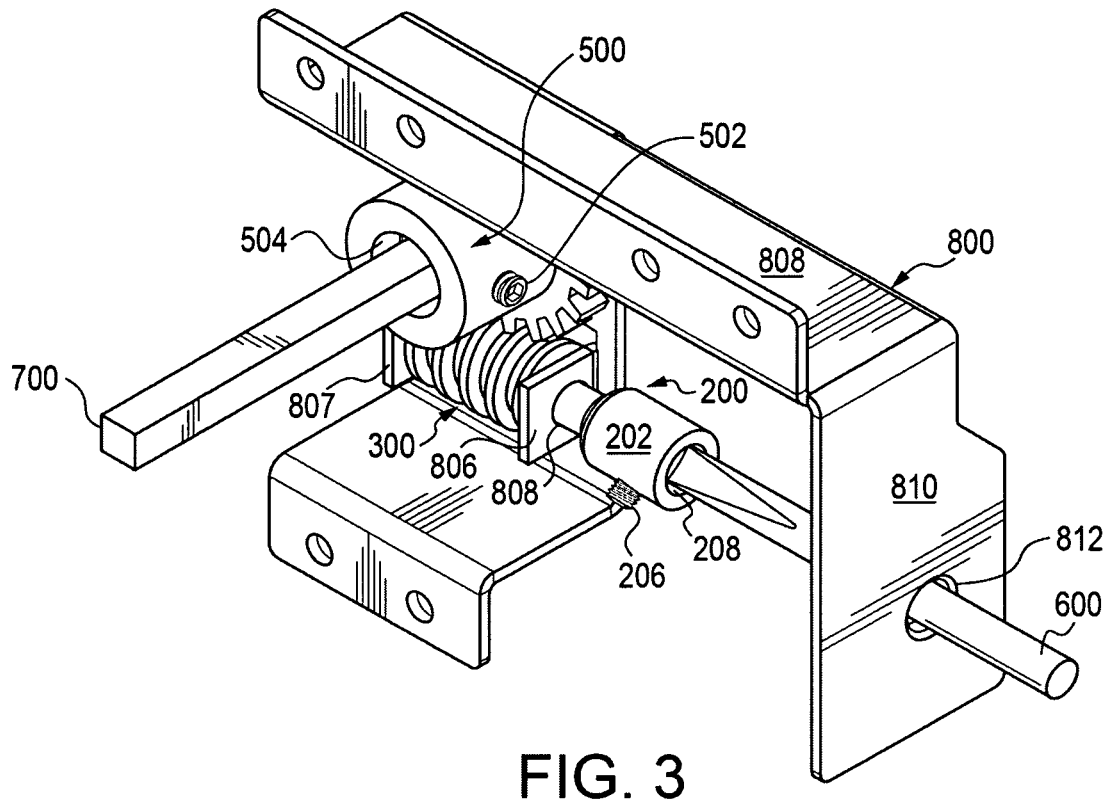
FIG. 3 is front isometric view of a the gear and coupling system mounted on a bracket shown in FIG. 1 receiving a first and second shaft.
Figure 4:
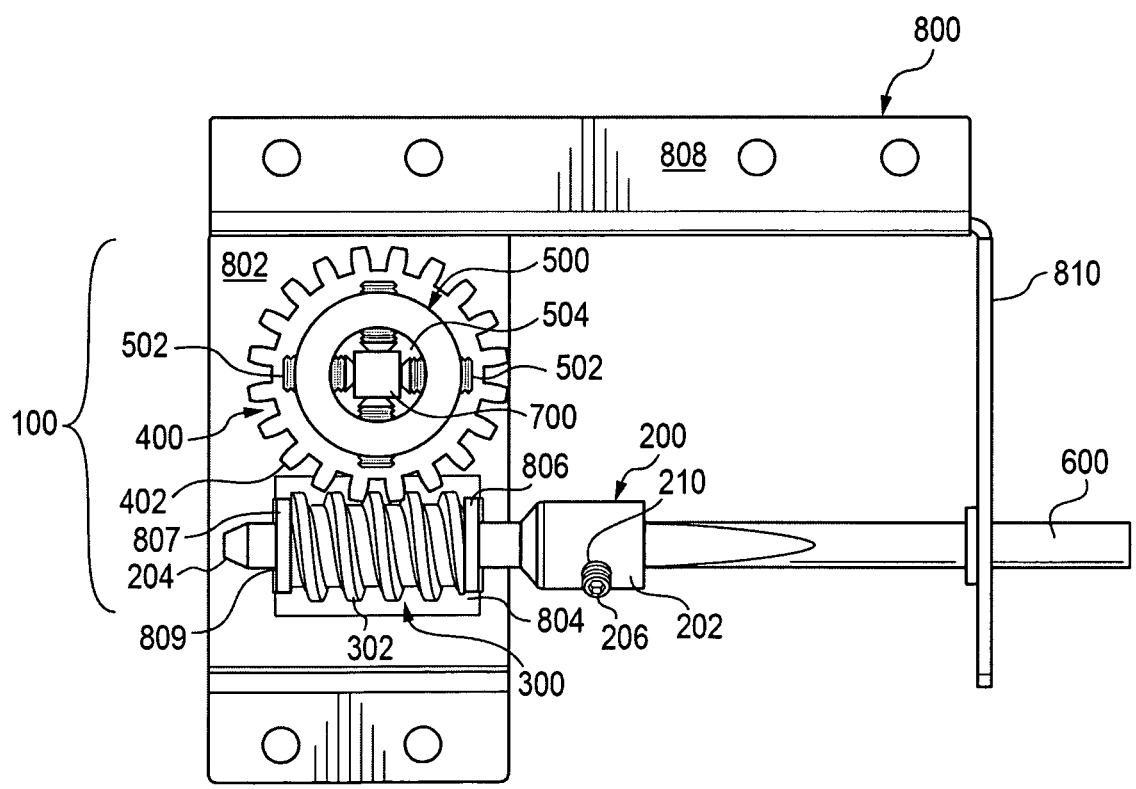
FIG. 4 is a front elevation view of a the gear and coupling system mounted on a bracket shown in FIG. 1 receiving a first and second shaft.

The gear and coupling system 100 may be used to translate the rotational motion of one body to another body along a different axis. For example, as shown in FIGS. 3 and 4, the system 100 may be used to translate the rotational movement of one shaft (a worm shaft 600) around the longitudinal axis of the worm gear 300 to another shaft (a planetary shaft 700) around the longitudinal axis of the planetary gear 400. The worm shaft 600 may serve as the drive shaft for the system 100. The worm shaft 600 and the planetary shaft 700 may be a rigid or flexible body, such as a flexible cable.

The worm shaft 600 may be removably coupled to the worm gear 300 via the worm coupling 200. As shown in FIGS. 5 and 6, the elongated portion 204 of the worm coupling 200 is inserted into the bore 304 in the worm gear 300. For example, the elongated portion 204 of the worm coupling 200 may be knurled and slightly larger in diameter than the bore 304. The elongated portion 204 is press fit into the worm gear 300. To couple the worm shaft 600 with the worm gear 300, the worm shaft 600 is inserted into the opening 208 in the head 202 of the worm coupling 200 and secured therein by one or more set screws 206. In addition to coupling the worm shaft 600 with the worm gear 300, the worm coupling 200, particularly the elongated portion 204, serves as the axle of the worm gear 300. Thus, rotation of the worm shaft 600 will cause the worm gear 300 to rotate along its longitudinal axis.

Referring again to FIGS. 3 and 4, the planetary shaft 700 may be removably coupled with the planetary gear 400 via the planetary coupling 500. The planetary shaft 700 is inserted into the bore 504 in the planetary coupling 500 and secured therein by the set screws 502. As shown in FIGS. 3 and 4, the planetary coupling 500 includes four bores 504 and four set screws 502.

The opening 208 in the worm coupling 200 may have a variety of cross-sectional shapes, which are generally complementary to the shape of the cross-section of the worm shaft 600. For example, as shown in FIG. 5, the opening 208 and the cross-section of the worm shaft 600 proximate to the worm coupling 200 has a square shape. Alternately, the opening 208 and the cross-section of the worm shaft 600 may have other shapes for example, circular or hexagonal. The bore 504 in the planetary coupling 500 may have a circular cross-section, which may receive planetary shafts 700 of various cross-sectional shapes, such as circular, square (which is shown in FIGS. 3 and 4) and hexagonal. By using a multiple of bores 504 and set screws 502, such as four, the planetary coupling 500 may accommodate planetary shafts 700 with cross-sections significantly smaller than that of the planetary coupling 500.

The system may be supported by a bracket 800. One example of such a bracket 800 is shown in FIGS. 1-4. As shown in FIGS. 3 and 4, the bracket may include a lower support 802, a side support 808 and an end support 810. The worm gear 300 and the planetary gear 400 are supported by the lower support 802. The planetary gear 400 is secured to the lower support 802 so that its longitudinal axis is about perpendicular with the lower support 802. The planetary gear 400 may go through a bore 504 in the lower support 802 and be attached to the bore 504 via a snap ring or retaining ring (not shown) located on the side of the lower support 802 opposite the planetary coupling 500. The lower support 802 includes a pair of protrusions 806 and 807 that support the worm coupling 200. The protrusions 806 and 807 each include a bore 811 and 809, respectively, through which the axle of the worm gear 300 (the elongated portion 204 of the worm coupling 200) is inserted. To secure the worm gear 300 in the bracket 800, the elongated portion 204 may be knurled and inserted through protrusion 806, press fit into the worm gear 300 and then extended through the other protrusion 807. The worm gear 300 and the planetary gear 400 are located on the lower support 802 of the bracket 800 in such proximity with each other so that the threads 302 of the worm gear 300 mesh with the teeth 402 of the planetary gear 400.

The side support 808 of the bracket 800 attaches the lower support 802 to the end support 810 so that the end support 810 faces the lower support 802. The end support 810 may include a bore 812 through which the worm shaft 600 may protrude. This arrangement provides support to the worm shaft 600 and aligns the longitudinal axis of the worm shaft 600 with that of the worm coupling 200.

The bracket 800 may be manufactured from a material such as metal or engineered plastic. The bracket 800 may be made from a single piece of material (for example, stamped in one piece from a single sheet of metal) and folded to obtain the desired shape. Alternately, the components of the bracket 800 may be manufactured separately and secured together via, for example, welding, screwing and/or soldering.

Figure 8:
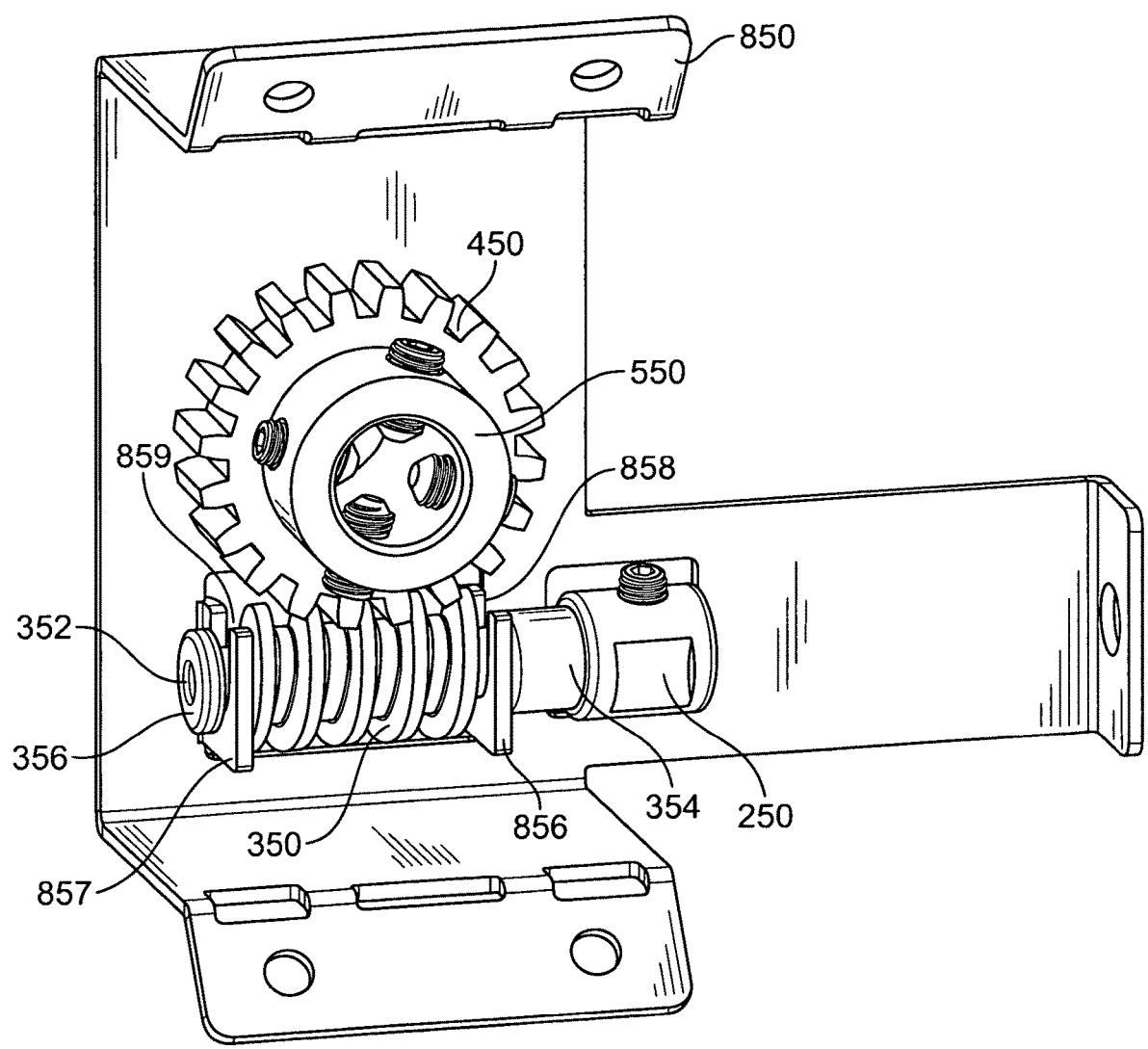
FIG. 8 is an alternative embodiment of a gear and coupling system.

In an alternative embodiment, instead of having bores 811 and 809, protrusions 806 and 807 may be formed as yokes having an opening on the side toward the planetary gear. Referring to FIG. 8, a gear and coupling system is shown having a worm gear 350 and a planetary gear 450 that are mounted on a bracket 850. Bracket 850 is provided with yokes 856 and 857 having openings 858 and 859, respectively, on the side toward planetary gear 450. Axle 352 of worm gear 350 is inserted in openings 858 and 859 and supported on yokes 856 and 857. Axle 352 is further provided with a collar 354 and radial flange 356 that are positioned outside of yokes 856 and 857, respectively. Both collar 354 and radial flange 356 have diameters that are larger than openings 858 and 859, to prevent worm gear 350 from slipping laterally within yokes 856 and 857. The assembly of planetary gear 450 on bracket 850 prevents worm gear 350 from inadvertently lifting out of yokes 856 and 857 and further secures worm gear 300 in place.

Figure 7:
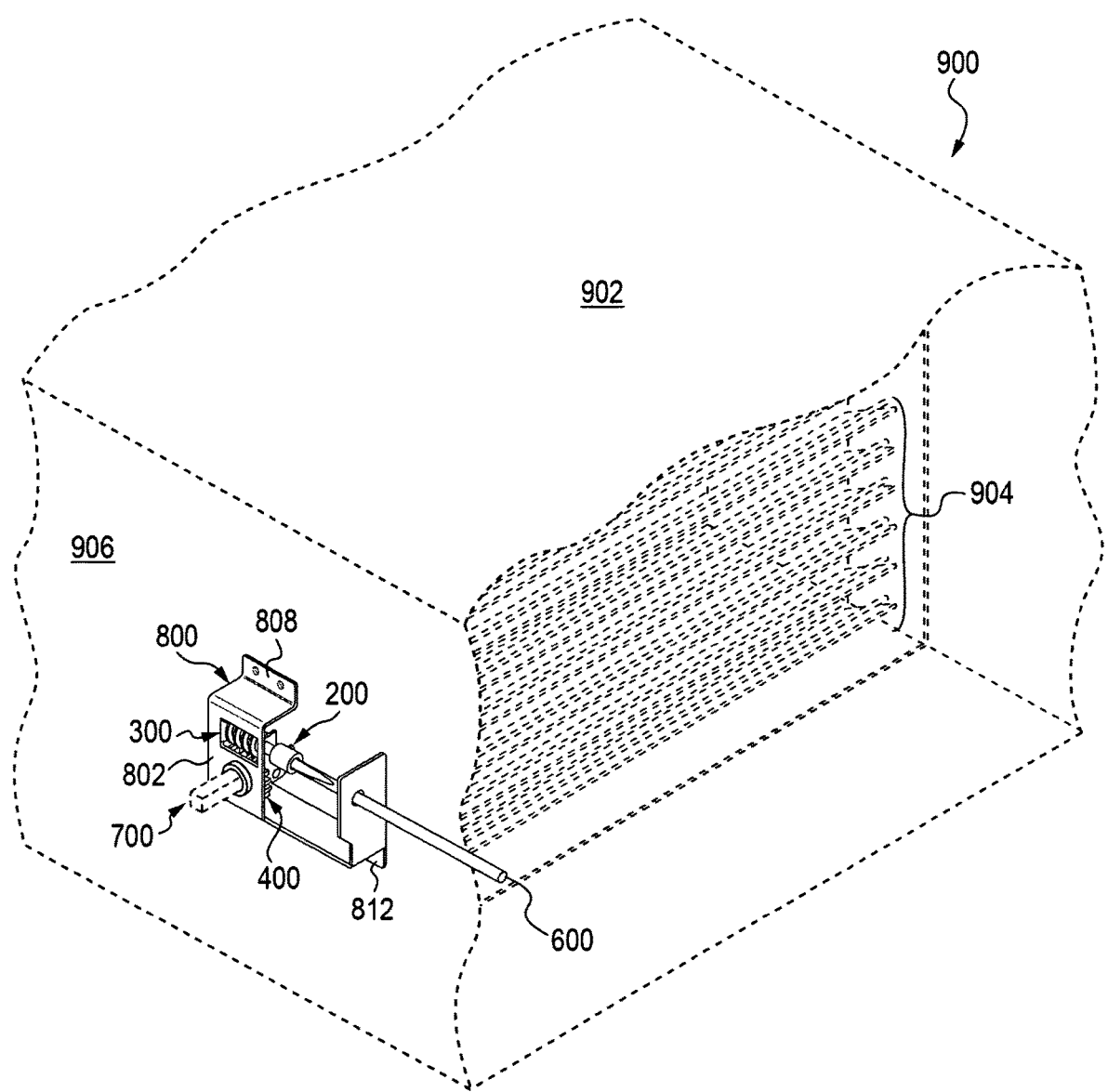
FIG. 7 is an isometric view of the gear and coupling system shown in FIG. 3 in operative communication with plenums in a duct.

One application for which a gear and coupling system may be used is shown in FIG. 7. In this example, the gear and coupling system 100 is used to control the motion of a damper 904 within a plenum 900, such as a heating, ventilation and air conditioning (HVAC) duct. In the plenum 900, airflow is controlled by the position of the dampers 904. If the dampers 904 are positioned so that they are parallel with the top 902 of the plenum, the maximum amount of air is permitted to flow. In contrast, if the dampers 904 are positioned so that they are perpendicular with the top 902 of the plenum, air is restricted from flowing through the plenum 900. Movement of the dampers 904 is controlled by the rotation of the planetary shaft 700.

Due to the size and the shape of the aperture 504 and set screws 502 (see FIG. 3) in the planetary coupling 500, planetary shafts 700 of different sizes and shapes may be accommodated. For example, the aperture 504 and set screws 502 (see FIG. 3) may accommodate a 0.25 or 0.375 inch square shaft. Alternately, the aperture 504 and set screws 502 (see FIG. 3) may accommodate 0.25 or 0.5 inch round shaft 700.

Such plenums 900 may be located in areas that are not conveniently or easily accessible. For example, the plenum 900 may be located in a ceiling, wall or floor. Therefore, some type of device is needed to enable the dampers 904 to be remotely controlled. This device may include a worm shaft 600. The worm shaft 600 may include, for example, a flexible or non-flexible cable. If the plenum 900 is installed in a ceiling, the worm shaft 600, which is in communication with the worm coupling 200, may protrude from the ceiling. Thus, the dampers 904 may be controlled by rotating the protruding worm shaft 600.

Figure 9:
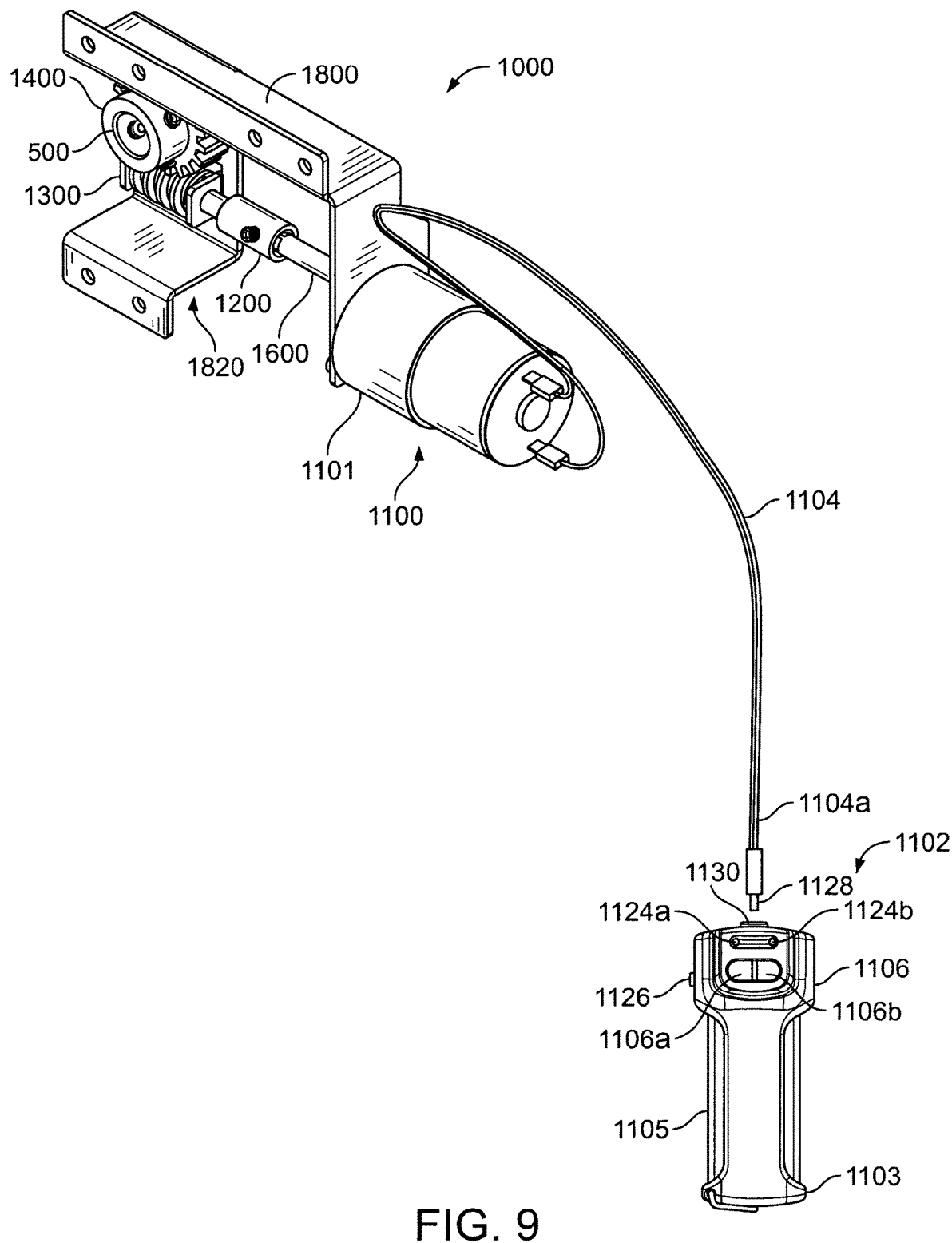
FIG. 9 is an isometric view of a motorized gear and coupling system.
Figure 10:
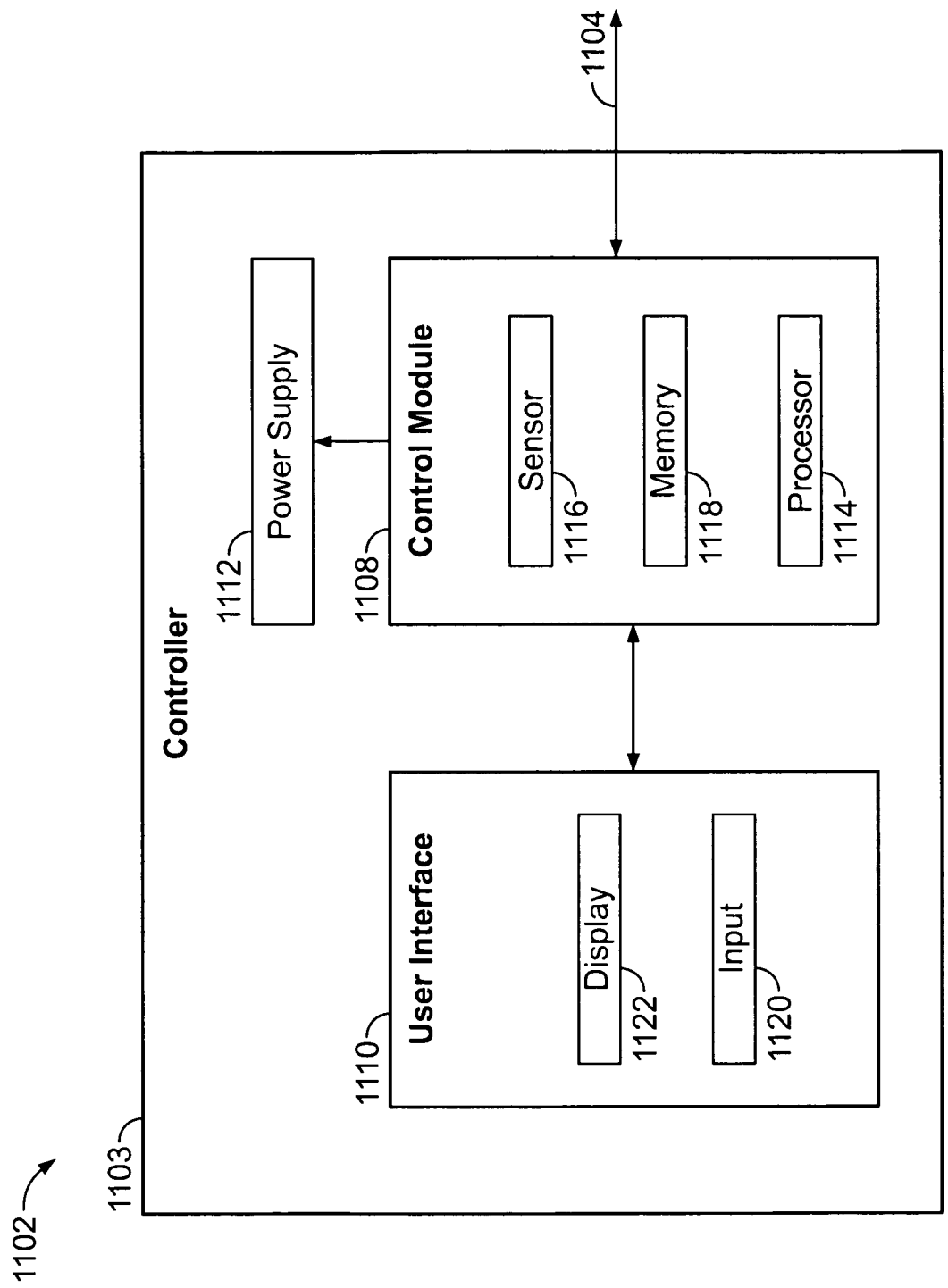
FIG. 10 is a functional block diagram of the controller of FIG. 9.

In an alternative embodiment, the rotation of the worm shaft may be driven by a motor. Referring to FIGS. 9 and 10, a motorized gear and coupling system 1000 is shown, which generally includes a worm gear coupling 1200, worm gear 1300, planetary gear 1400 and a planetary gear coupling 500, that are mounted on a bracket 1800. A worm shaft 1600 is coupled with worm gear 1300 through worm coupling 1200. A motor 1100 is mounted on end support 1810 of bracket 1800, that is connected with and configured to rotate worm shaft 1600. The motor 1100 may have an output shaft that serves as a drive shaft and is inserted directly into the worm coupling 1200, thus eliminating the need for a separate worm shaft. Motor 1100 may be removably mounted on bracket 1800 using bolts, screws or other fasteners (not shown) that are well known in the art. Motor 1100 is operated by a controller 1102, which is in electromechanical communication with the motor via a cable 1104.

Motor 1100 is preferably a direct current, low voltage motor (e.g., a 9 V, 12 V or 18 V motor) having low rpm and low torque. As is well known in the art, motor 1100 may be a gear-motor that includes a gear set 1101 to gear down the speed of the motor to accommodate the requirements of a particular application. When motorized gear and coupling system 1000 is used to control the motion of a damper, it is presently preferred that motor 1100 be geared down such that it takes approximately 10-15 seconds for the dampers to move from a position of maximum airflow to a position of minimum airflow (or vice versa). It has been found that a motor and gear set that rotates worm shaft 1600 in a range of about 30 rpm to about 35 rpm is particularly useful for controlling dampers when the gear and coupling system includes a worm gear and planetary gear. However, those of skill in the art will appreciate that the gear ratio of the worm gear and planetary gear (or other intervening gearing between the motor and the damper) may also be a factor in determining the optimal motor speed.

As best shown in FIGS. 9 and 10, controller 1102 includes a switch 1106, a control module 1108, a user interface 1110 and a power supply 1112. Control module 1108 includes a microprocessor 1114 and a sensor 1116. User interface includes an input 1120 and a display 1122. In a preferred embodiment, controller 1102 is a portable handheld device having a housing 1103 that contains switch 1106, control module 1108, user interface 1110 and power supply 1112. Housing 1103 may be ergonomically designed and may be provided with a textured grip 1105. Housing 1103 may be provided with other features to enhance its portability, such as a belt clip and/or retractable reel (not shown).

Motorized gear and coupling system 1000 is operated by actuating switch 1106, which provides a signal to microprocessor 1114 via input 1120. Microprocessor 1114, in turn, provides a current from power supply 1112 through cable 1104 to motor 1100, to drive worm shaft 1600 and operate gear and coupling system 1000. Sensor 1116 monitors the operation of motor 1100 and provides a signal to microprocessor 1114. Based on the signals from switch 1106 and/or from sensor 1116, microprocessor 1114 directs display 1122 to provide an indicia that reflects the operational condition of gear and coupling system 1000 and/or controls the current provided to motor 1100 from power supply 1112.

In a preferred embodiment, switch 1106 is a 3-position rocker switch having a rest position, a first position 1106a and a second position 1106b. Actuating switch 1106 at the first position 1106a sends a first signal to microprocessor 1114 to provide a current from power supply 1112 and operate motor 1100 to rotate worm shaft 1600 in a first, forward direction. Actuating switch 1106 at the second position 1106b sends a second signal to microprocessor 1114 to reverse the polarity of the current from power supply 1112 and operate motor 1100 to rotate worm shaft 1600 in a second, reverse direction. When neither position 1106a nor 1106b are actuated, switch 1106 returns to the rest position and no current is provided to motor 1100. Those of skill in the art will appreciate that other type of switches may be used, such as separate buttons 2106a and 2106b for forward and reverse, rather than a rocker switch, as shown in FIG. 11.

In a further preferred embodiment, sensor 1116 detects the level of current draw by motor 1100. In a first operating condition, motor 1100 rotates freely and sensor 1116 detects a first level of current draw and sends a first signal to microprocessor 1114. In a second operating condition, motor 1100 experiences resistance to rotation which increases the current draw by the motor. Sensor 1116 detects the increased current draw and sends a second signal to microprocessor 1114 to shut off the current from power supply 1112 to motor 1100.

Display 1122 is controlled by microprocessor 1114 in response to signals from rocker switch 1106 and/or sensor 1116. In a preferred embodiment, display 1122 comprises LEDs 1124a and 1124b that provide indicia of the operating condition of motor 1100. As best shown in FIG. 9, LEDs 1124a and 1124b positioned to correspond to first and second positions 1106a and 1106b of a rocker switch 1106. The actuation of rocker switch 1006 at first position 1106a sends a first signal to microprocessor 1114 which, in turn, directs first LED 1124a to provide a first indicia that motor 1100 is rotating in a first direction. When motor 1100 experiences resistance to rotation, such as when worm shaft 1600 is prevented from rotating, sensor 1116 sends a second signal to microprocessor 1114 which, in turn, directs first LED 1124a to provide a second indicia that motor 1100 has experienced a change in operating condition. LED 1124b similarly provides indicia that motor 1100 is operating in a second, reverse direction, and whether motor 1100 has experienced a change in operating condition.

For example, when motorized gear and coupling system 1000 is used to control the motion of a damper, actuating rocker switch 1106 at position 1106a causes the motor to rotate in a first direction and causes LED 1124a to turn green, indicating that the dampers are moving toward an open position to allow maximum airflow. Once the dampers are in the fully open position and have reached the end of their range of motion, worm shaft 1600 is prevented from further rotation, the current to motor 1100 is shut off, and LED 1124a turns red to indicate that the dampers have stopped moving and are fully open. Conversely, when rocker switch 1106 is actuated at position 1106b, motor 1100 operates in reverse and LED 1124b turns green, indicating that the dampers are moving toward a closed position to restrict airflow. Once the dampers are in the fully closed position and have reached the end of their range of motion in the opposition direction, worm shaft 1600 is once again prevented from further rotation, the current to motor 1100 is shut off, and LED 1124b turns red to indicate that the dampers have stopped moving and are fully closed, resulting in a minimum of airflow.

Power supply 1112 may be of any type sufficient to operate motor 1100. In a preferred embodiment, power supply 1112 is a low voltage power supply that is small enough for a portable device and is easily replaced, such as a 9 V battery. Controller 1102 may include a shutoff switch 1126 to turn off the controller and prevent the battery from being drained by the continuing draw from microprocessor 1114 or by the inadvertent actuation of switch 1106.

Controller 1102 is connected to motor 1100 by a cable 1104. Cable 1104 may be of any type suitable for the application. For example, when motorized gear and coupling system 1000 is used to control a damper, cable 1104 is preferably a two conductor, plenum rated cable or similar fire rated cable. The connections between cable 1104 and motor 1100 and/or between cable 1104 and controller 1102 may be soldered or may use any of a variety of electrical connectors that are known in the art. In a preferred embodiment, cable 1104 is detachably connected to controller 1102, to create a modular system where a single controller may be used with multiple different motorized gear and coupling systems 1000. As shown in FIG. 9, cable 1104 has an end 1104a that terminates in a standard 2.1 mm connector mini power plug 1128. Controller 1102 is provided with a corresponding mini power jack 1130 for receiving plug 1128. Those of skill in the art will appreciate that other types of detachable electrical connectors may be used, depending on the voltage of the power source and the type of information that is transmitted between motor 1100 and controller 1102.

Figure 11A:
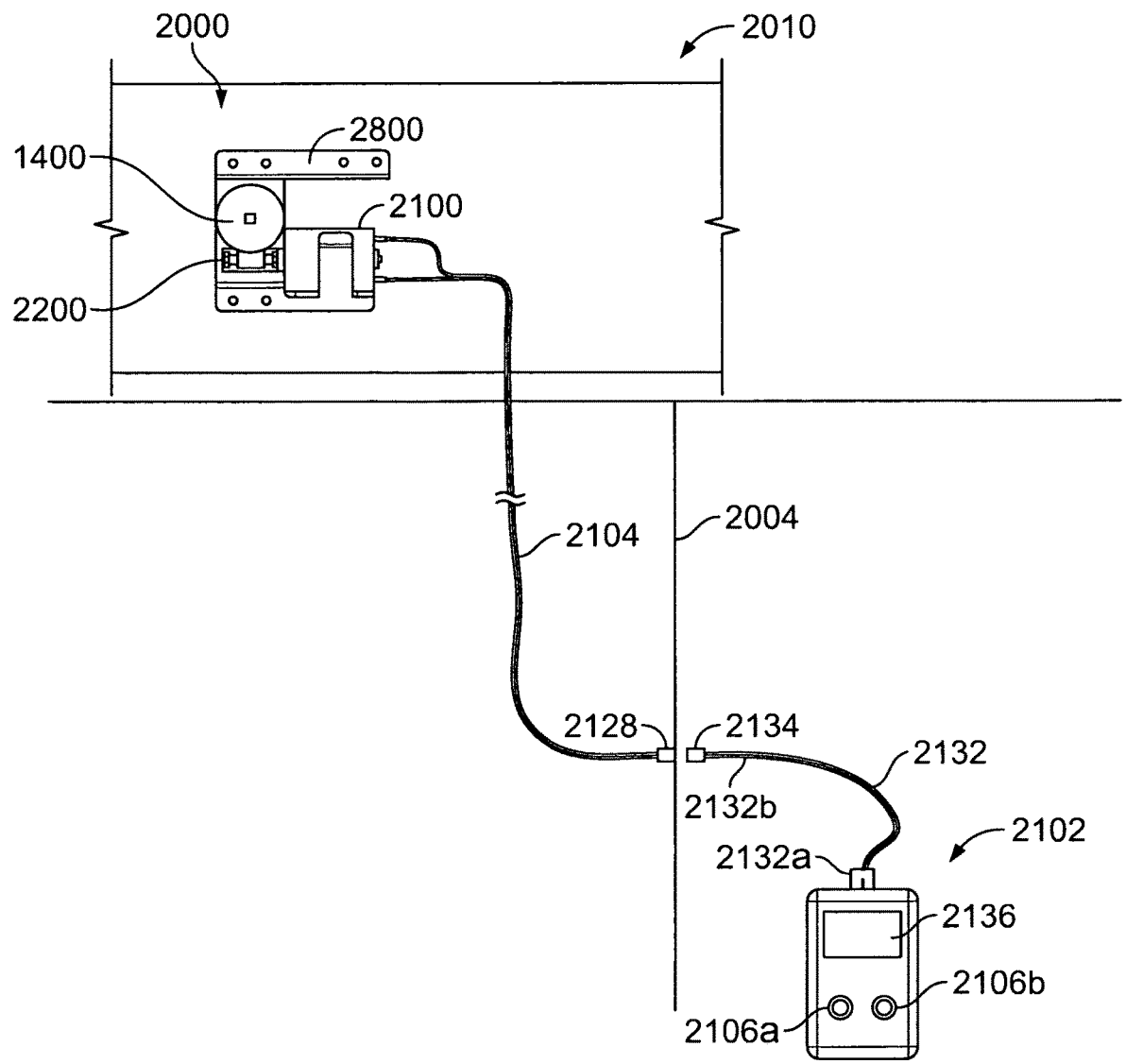
FIG. 11a is a side elevation view of the motorized gear and coupling system shown in FIG. 9 adapted to operate a damper.
Figure 11B:
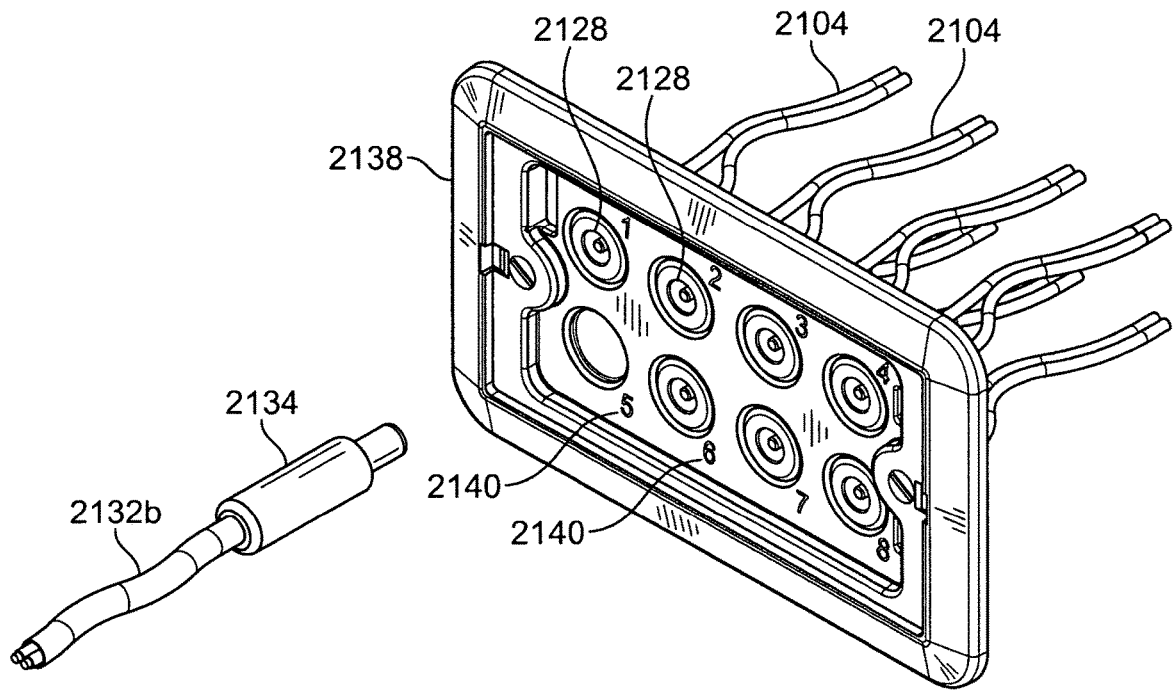
FIG. 11b is an isometric view of a wall plate for mounting multiple electrical connectors corresponding to multiple different motorized gear and coupling systems at different locations.

Referring to FIGS. 11a and 11b, an alternative embodiment of a motorized gear and coupling system is shown that is adapted to operate a damper. Motorized gear and coupling system 2000 generally comprises a worm gear/coupling 2200, planetary gear/coupling 1400 and motor 2100 that are mounted on a bracket 2800, a cable 2104 and a controller 2102. Bracket 2800 is mounted at a plenum 2010, such as a ceiling plenum for use in an HVAC system. Preferably, motorized gear and coupling system 2000 is mounted on plenum 2010, but may also be mounted on the damper or a nearby structure. A damper (not shown) is mounted within plenum 2010 to regulate airflow, and is operated by motorized gear and coupling system 2000.

Cable 2104 extends from motor 2100 at plenum 2010 to a remote location and terminates in a detachable electrical connection 2128. In a preferred embodiment, electrical connection 2128 is mounted in a wall 2004 at a location that is conveniently accessible to the user. This configuration permits the gear and coupling system, including the motor, to be installed on a plenum, leaving the controller as the only external part of the system.

Controller 2102 includes a cable 2132 that has a first end 2132a that is connected to the controller and a second end 2132b that terminates in a detachable electrical connection 2134 which corresponds to detachable electrical connection 2128 of cable 2104. In a preferred embodiment, detachable electrical connections 2134 and 2128 are a mini power plug and jack, respectively. End 2132a of cable 2132 may be connected to controller 2102 by soldering or may use any of a variety of electrical connectors that are known in the art. In a preferred embodiment, end 2132a of cable 2132 is also connected to controller 2102 by a detachable electrical connection, such as a mini power plug/jack.

As best shown in FIG. 11b, a modular system may include a wall plate 2138 for mounting multiple electrical connections 2128 corresponding to different motorized gear and coupling systems. Wall plate 2138 is installed at a convenient location, such that multiple motorized gear and coupling systems at different locations may be easily controlled by alternately connecting the plug 2134 of a controller 2102 into the various electrical connectors 2128. Indicia 2140 may be provided on wall plate 2138 to identify the different motorized gear and coupling system associated with each electrical connection 2128.

In a further alternative embodiment, the controller may provide the user with additional information, such as battery life, identification of the damper being controlled, the position of the dampers relative to the fully open/closed position, and other information. To accommodate these additional features, the controller may be provided with an alphanumeric display 2136, rather than simple LEDs. The controller may also include a memory 1118 to store data. In addition, cables 2104 and 2132 may be four conductor cables with appropriate electrical connectors 2128, 2134.

Those of skill in the art will appreciate that the motorized gear and coupling system described herein is not limited to a worm gear and planetary gear, but may be adapted for use with other gearing systems, such as miter gears or a friction drive. Furthermore, in some cases, the operation of a damper may not require the translation of rotational movement, but may be directly driven by the motor through a drive shaft.

Figure 12:
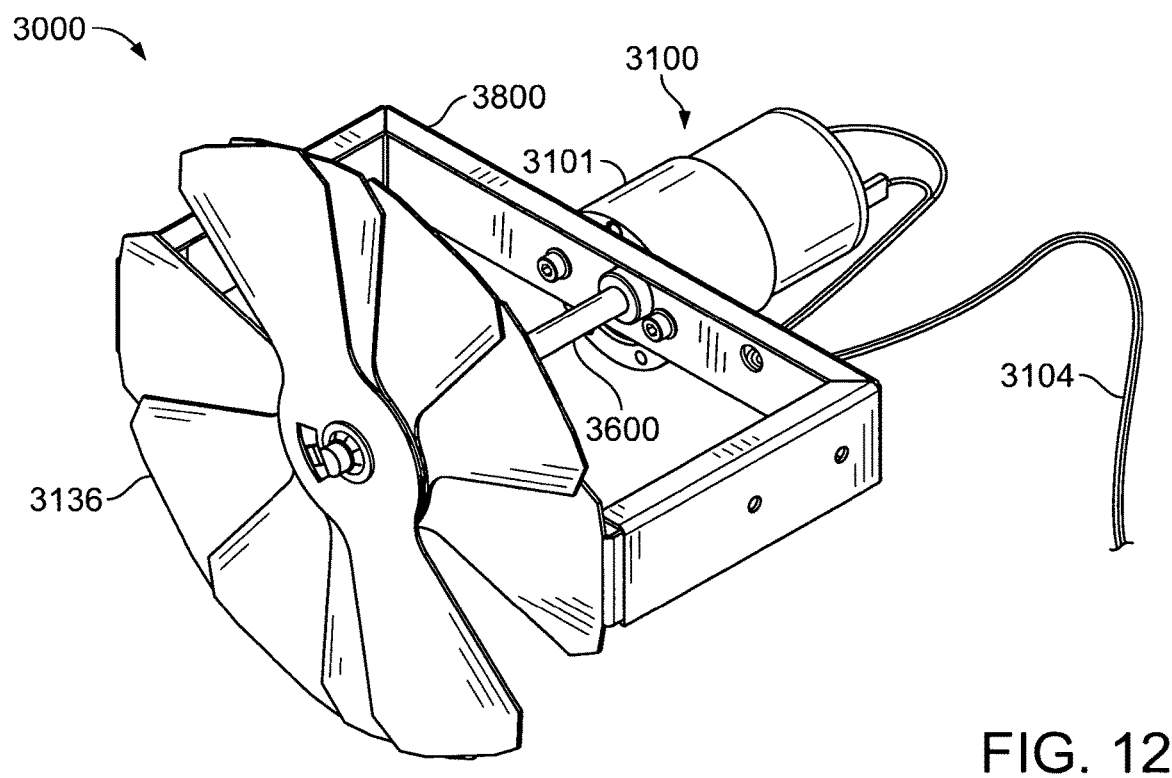
FIG. 12 is an isometric view of an alternative embodiment of a system for controlling airflow through a plenum.
Figure 13:
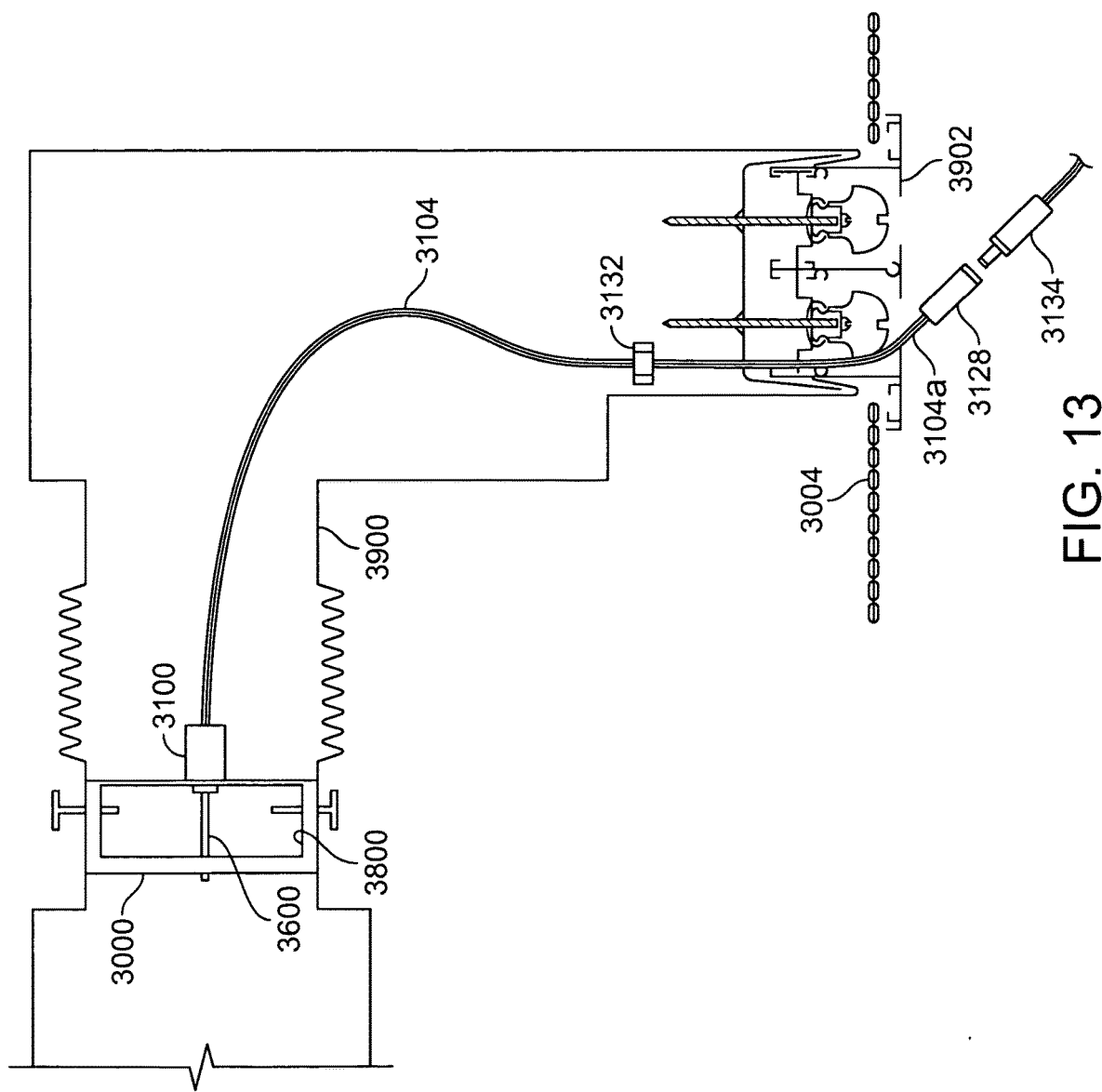
FIG. 13 is a side elevation view of the system of FIG. 12, mounted in a plenum.

Referring to FIGS. 12 and 13, an alternative embodiment of a system for controlling airflow through a plenum is shown. A rotary damper 3000 and a motor 3100 are mounted on a bracket 3800. Motor 3100 is directly connected to rotary damper 3000 by a drive shaft 3600, without intervening gearing. Rotary damper 3000 may be removably coupled to drive shaft 3600 by a coupling (not shown) in the same manner as previously described couplings 200 and 500. A controller (not shown) is connected to motor 3100 by cable 3104.

The movement of rotary damper 3000 between open (maximum airflow) and closed (restricted airflow) positions is controlled by the rotation of drive shaft 3600. The operation of motor 3100 causes drive shaft 3600 to rotate damper blades 3136 and either open or close damper 3000, depending on the direction of rotation of the motor. Those of skill in the art will appreciate that it requires less than a single revolution of drive shaft 3600 to rotate damper blades 3136 from a fully open to a fully closed position (or vice versa). Thus, in a preferred embodiment, motor 3100 is a gear-motor that contains an appropriate gear set 3101 to gear down the motor and ensure that it takes approximately 10 to 15 seconds for damper blades 3136 to move between open and closed positions. It has been found that a gear motor capable of rotating drive shaft 3600 at a speed of about 2.5 rpm is particularly useful.

Referring to FIG. 13, rotary damper 3000 and motor 3100 are shown mounted in a plenum 3900 to control the airflow through the plenum. Thus, motor 3100 is positioned in the airstream when used in an HVAC system or other regulated airflow system. Cable 3104 may extend from motor 3100 through plenum 3900 to a remotely located diffuser 3902 or other opening in the plenum system. In a preferred embodiment, diffuser 3902 is located in a ceiling 3004 or other structure where the end 3104a of cable 3104 is conveniently accessible for connection to a controller. End 3104a of cable 3104 is provided with a detachable electrical connector 3128 (e.g., a mini power jack) for connection to the corresponding detachable electrical connector 3134 (e.g., a mini power plug) of a controller. In addition, end 3104a may be secured to plenum 3900 at or near diffuser 3902, using a clamp 3132 or by other means known in the art.

In an alternative embodiment, cable 3104 may exit the plenum through a hole in the wall of the plenum (not shown) that is made by drilling, punching or other means known in the art. The hole may be provided with a grommet (not shown) to protect cable 3104 from fraying or shearing caused by the edges of the hole. Cable 3104 extends from motor 3100 at plenum 3900 to a remote location and terminates in a detachable electrical connection, such as previously described wall plate 2138.

Figure 16A:
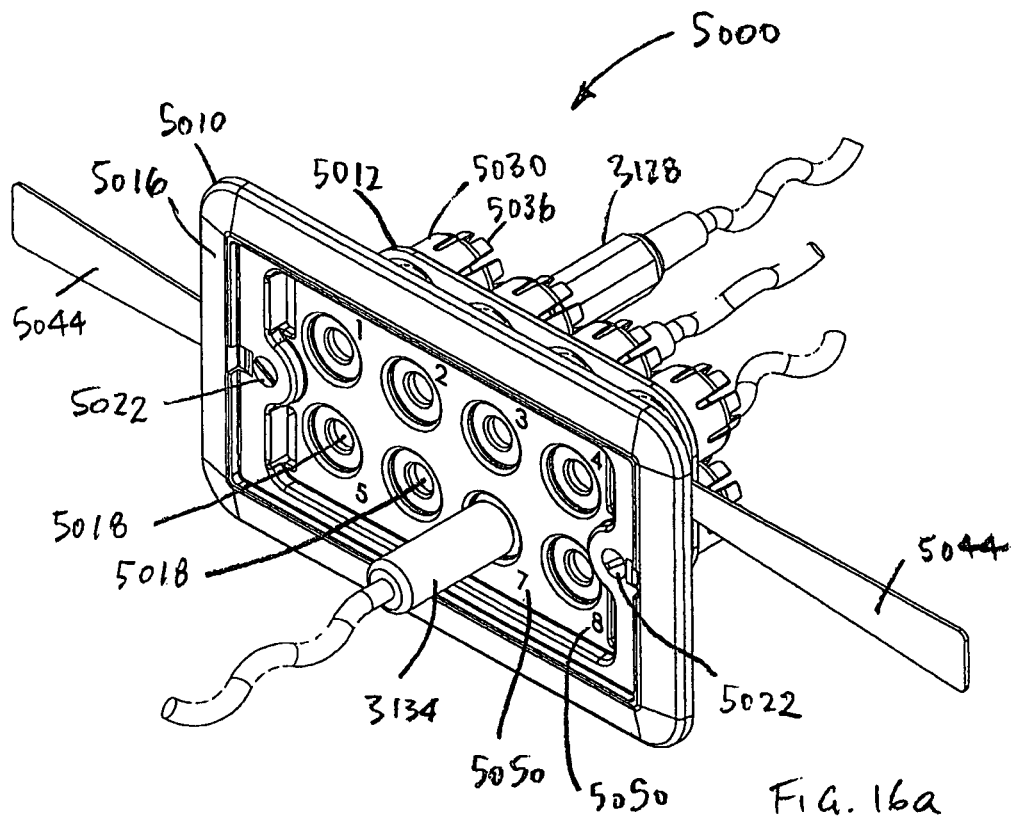
FIG. 16a is an isometric view of the front side of a wall plate for mounting multiple electrical connectors remotely from the motor.
Figure 16B:
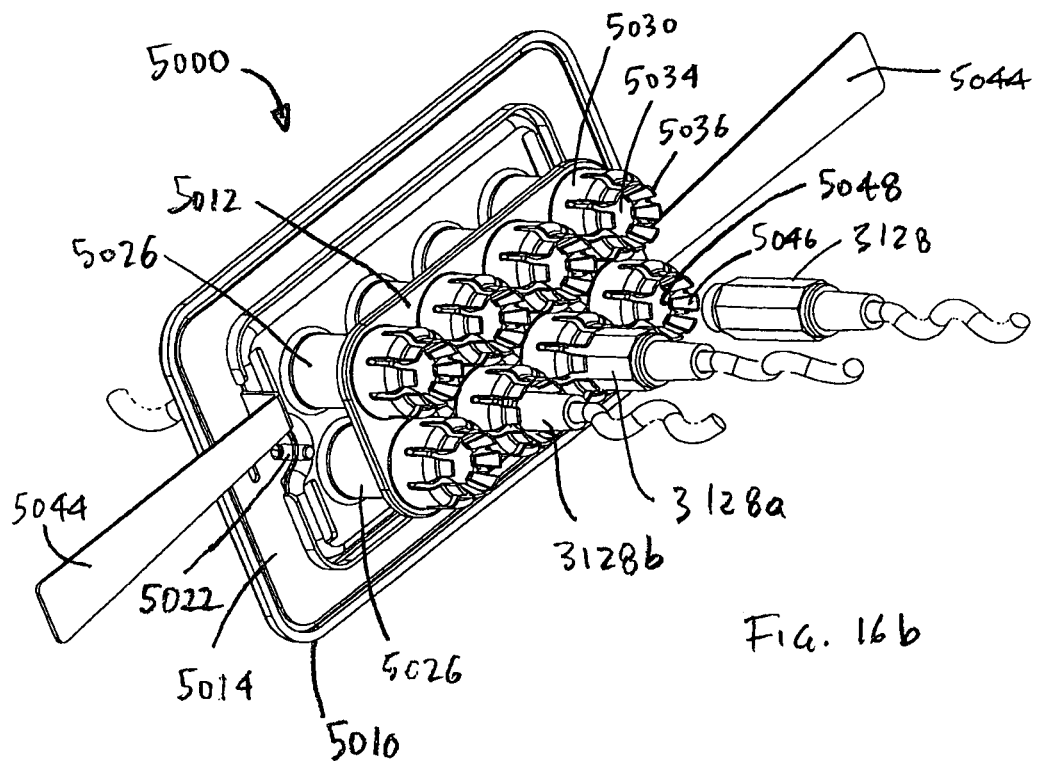

Referring to FIGS. 16a, 16b, 17a and 17b, a preferred embodiment of a wall plate for mounting multiple detachable electrical connectors remotely from the motor is shown. Wall plate 5000 comprises a front plate 5010 for receiving the electrical connectors, a rear plate 5012 for removably securing the electrical connectors in the wall plate, and a mounting bracket 5014. Front plate 5010 is installed over an opening in a wall or other structure that provides access to one or more cables 3104. As best shown in FIGS. 16a and 17a, the front side 5016 of front plate 5010 is provided with multiple openings 5018 that are sized and shaped to permit insertion of an electrical connector, such as mini power plug 3134. Front plate 5010 is further provided with holes 5020 for receiving screws 5022 or other fasteners to secure the front plate to mounting bracket 5014. Alternatively, front plate 5010 may be screwed to an electrical wall box or other structure, as is known in the art. As best shown in FIGS. 16b and 17b, the rear side 5024 of front plate 5010 has multiple rearwardly projecting housings 5026 with openings 5028, that are sized and shaped to receive an electrical connector, such as mini power jack 3128. Each housing 5026 is positioned to correspond to, and is accessible through, an opening 5018 of front side 5016.

Rear plate 5012 is provided with multiple wells 5030 having a front opening 5032 that are positioned to correspond to housings 5026 of front plate 5010. Each well is sized and shaped to receive a housing 5026 of front plate 5010. Wells 5030 are provided with a rear opening 5034 that is defined by one or more inwardly projecting flanges 5036 for receiving and securing mini power jack 3128 in housing 5026.

Wall plate 5000 is assembled by fitting rear plate 5012 onto rear side 5024 of front plate 5010, such that wells 5030 of the rear plate fit over housings 5026 and cover the openings 5028 of the front plate. Because flanges 5036 are inwardly projecting, opening 5034 on rear plate 5012 is smaller than housing 5026, such that housing 5026 cannot pass through and rests within well 5030. Rear plate 5012 is preferably coupled to front plate 5010 by interference or friction fit. To facilitate the alignment and friction fit of the front and rear plates, one or more complementary pins 5038 and 5040 may be provided on front and rear plates 5010 and 5012, respectively, as best shown in FIGS. 17a and 17b.

One or more mini power jacks 3128 (or other electric connectors) are mounted in wall plate 5000 by snap fit insertion of the mini power jack through opening 5034 on rear plate 5012 and into opening 5028/housing 5026 of front plate 5010. Because flanges 5036 are inwardly projecting, opening 5034 on rear plate 5012 is smaller than mini power jack 3128. As best shown in FIG. 16b, when the mini power jack (3128a) is inserted into opening 5034, flanges 5036 are sufficiently flexible to deflect from their original positions and allow opening 5034 to enlarge and accommodate insertion of the mini power jack. Once mini power jack (3128b) is fully inserted past flanges 5036, flanges 5036 and opening 5034 return to their original positions to snap fit and removably secure the mini power jack within housing 5026. The interior surface 5046 of flanges 5036 which defines opening 5034 may be inclined to facilitate the deflection of flanges 5036 and the insertion of mini power jack 3128 through opening 5034. In addition, interior surface 5046 of flanges 5036 may be provided with a sharply inclined lip 5048 to increase the difficulty in withdrawing mini power jack 3128 past flanges 5036 and through opening 5034 after the mini power jack is fully inserted in housing 5026.

Once mini power jack 3128 is inserted into housing 5026, it is accessible and may be connected to a complementary mini power plug 3134 through an opening 5018 of front plate 5010. As best shown in FIG. 16a, openings 5018 are sized and shaped to permit connection between mini power plug 3134 and mini power jack 3128, but are too small to permit the mini power jack to be removed from housing 5026. Indicia 5050 may be provided on front plate 5010 adjacent to each opening 5018, to permit ready identification of the mini power jack mounted within the corresponding housing 5026. A cover plate (not shown) may also be provided to conceal openings 5018 and give front plate 5010 a uniform appearance when not in use. Openings 5052 may be provided in front plate 5010 to attach the cover plate to the front plate by snap fit or other means known in the art.

The assembled wall plate 5000 is typically mounted over an opening in the wallboard panel of a wall (or other structure), through which the mini power jack(s) 3128 or other electrical connector is accessed. Mounting bracket 5014 is placed over the opening in the wall and tabs 5044 are manually bent outward from wall plate 5000 to extend behind the wallboard paneling (shown in FIGS. 16b and 17b) and secure the mounting bracket to the wall. Holes 5042 are provided in mounting bracket 5014, that are positioned to correspond to holes 5020 in front plate 5010. Once front plate 5010, rear plate 5012 and mini power jack(s) 3128 are assembled, the front plate is placed over mounting bracket 5014 such that holes 5020 and 5042 are aligned and the front plate and mounting bracket are secured together by screws 5022 to complete the installation of wall plate 5000 on the wall.

Front plate 5010 and rear plate 5012 may be made of plastic or other materials known in the art. In a preferred embodiment, front plate 5010 and rear plate 5012 are made of injection molded ABS plastic. Mounting bracket 5014 is similar in construction and use to commercially available low voltage mounting brackets for exiting construction.

Figure 18A:
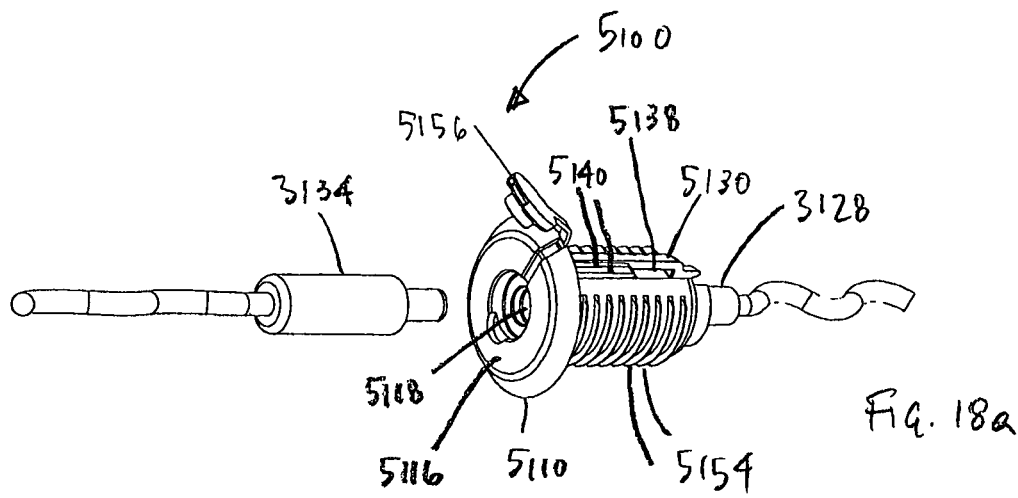
FIG. 18a is an isometric view of the front side of a wall plate for mounting a single connector remotely from the motor.
Figure 18B:
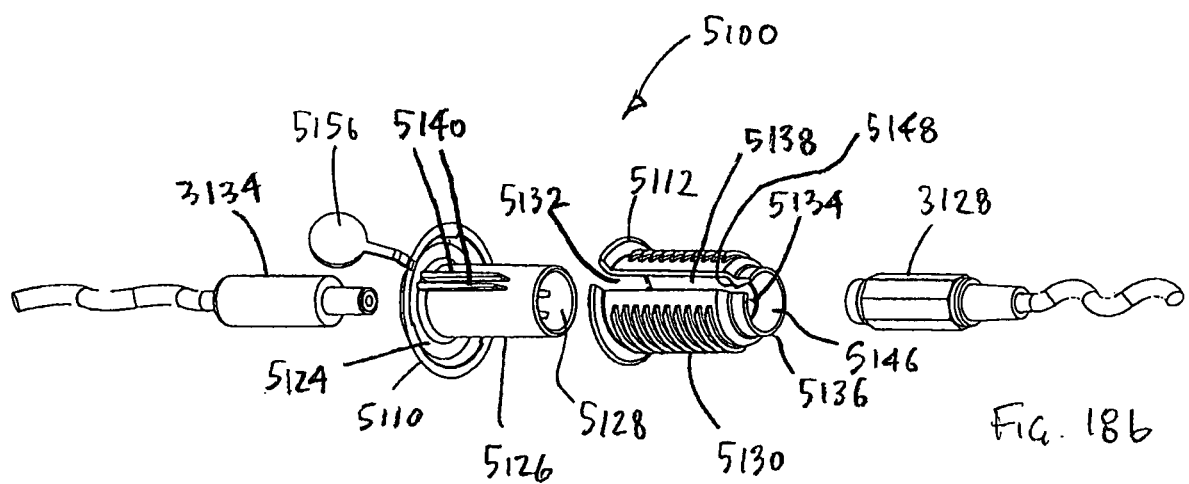

Referring to FIGS. 18a and 18b, an alternative embodiment of a wall plate is shown for mounting a single electrical connector remotely from the motor. Wall plate 5100 comprises a front plate 5110 and a rear plate 5112. Front plate 5110 has a front side 5116 with an opening 5118. The rear side 5124 of front plate 5110 has a housing 5126 with an opening 5128 that are sized and shaped to receive an electrical connector, such as a mini power jack 3128.

Rear plate 5112 is provided with a well 5130 having a front opening 5132 that is sized and shaped to receive housing 5126 of front plate 5110. Well 5130 is provided with a rear opening 5134 that is defined by an inwardly projecting flange 5136. Rear opening 5134 is sized and shaped to receive end 3104a of mini power jack cable 3104. A slot 5138 is formed in rear plate 5112 that is sized and shaped to receive cable 3104, and that extends the length of well 5130 and connects front opening 5132 and rear opening 5134.

Wall plate 5100 is assembled by fitting rear plate 5112 onto rear side 5124 of front plate 5110, such that well 5130 of the rear plate fits over housing 5126 and covers opening 5128 of the front plate. Similarly to the assembly of wall plate 5000, flange 5136 is inwardly projecting such that opening 5134 on rear plate 5112 is smaller than housing 5126, and the housing cannot pass through and rests within well 5130. Rear plate 5112 is preferably coupled to front plate 5110 by friction fit. Housing 5126 may be provided with ribs 5140 that are sized and shaped to be complementary to slot 5138 in rear plate 5112, and to facilitate the alignment and friction fit of the front and rear plates 5110 and 5112.

Similarly to the operation of wall plate 5000, a mini power jack 3128 (or other electric connector) is mounted in wall plate 5100 by inserting the mini power jack through opening 5128 and into housing 5126. The end 3104a of mini power jack cable 3104 is threaded through slot 5138 in rear plate 5112, such that cable 3104 is received in and projects out of rear opening 5134. Rear plate 5112 is then friction fit over housing 5126 to removably secure mini power jack 3128 within housing 5126, as shown in FIG. 18a.

In a preferred embodiment, wall plate 5100 is designed to be installed on wallboard or a similar structure without the need for screws or other fasteners. A hole is drilled or cut into the wallboard (not shown) having a diameter that is slightly smaller than the size of well 5130 of rear plate 5112. Mini power jack 3128 is fed through the hole and mini power jack cable 3104 is is threaded through slot 5138 in rear plate 5112. Well 5130 is then press fit into the hole until rear plate 5112 is flush with the surface of the wallboard. Mini power jack 3128 is received in housing 5126 and front plate 5110 is friction fit with rear plate 5112 to complete the installation of wall plate 5100. Ribs 5154 may be formed on the exterior surface of well 5130 to help secure wall plate 5100 in the wallboard structure. Once mounted in wall plate 5110, mini power jack 3128 is accessible and may be connected to a complementary mini power plug 3134 through opening 5118 of front plate 5010 in a similar manner as previously described. Because of its small size, a cover plate 5156 for concealing opening 5118 may be integrally formed with front plate 5110.

Wall plate 5000 and 5100 may be made of plastic, metal or other materials known in the art. In a preferred embodiment, the wall plate is made of a non-conductive material, such as injection molded nylon.

Figure 14:
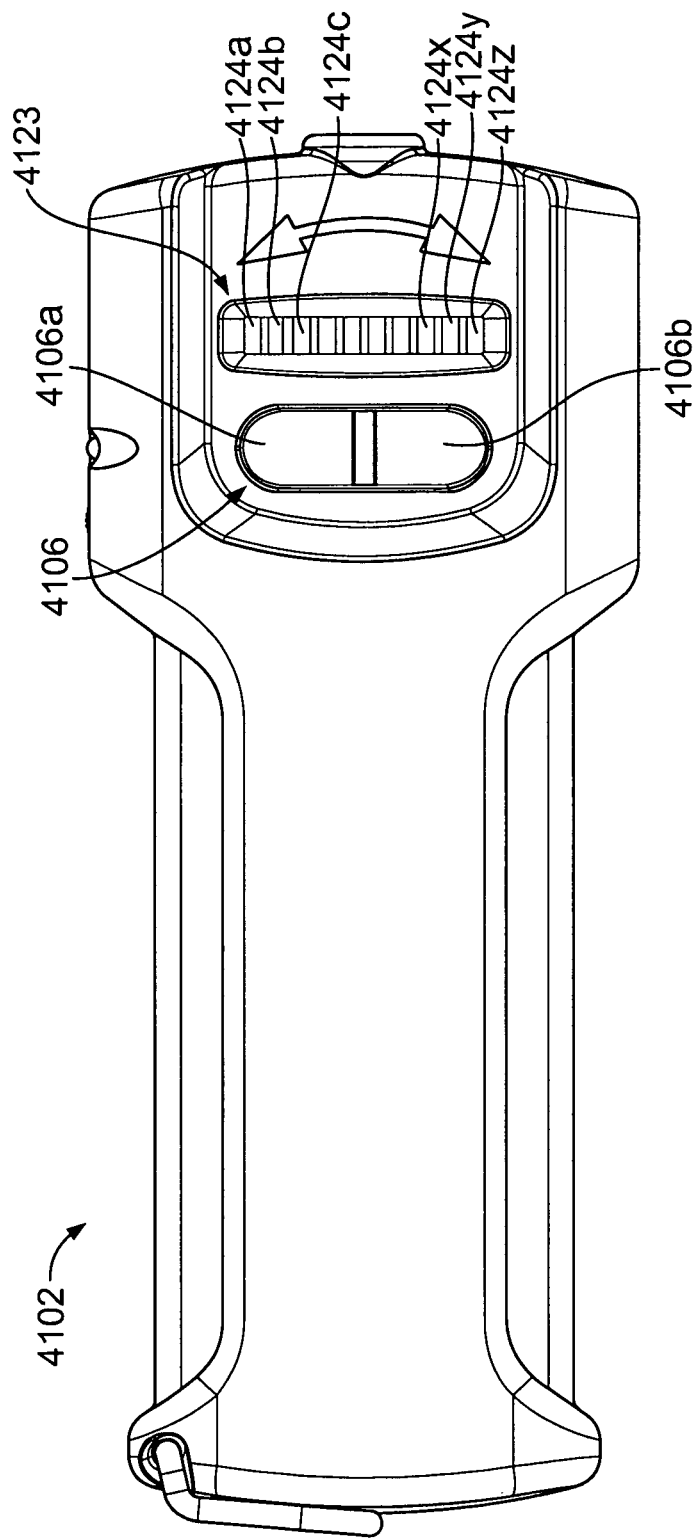
FIG. 14 is an alternative embodiment of the controller shown in the motorized gear and coupling system of FIG. 9.
Figure 15:
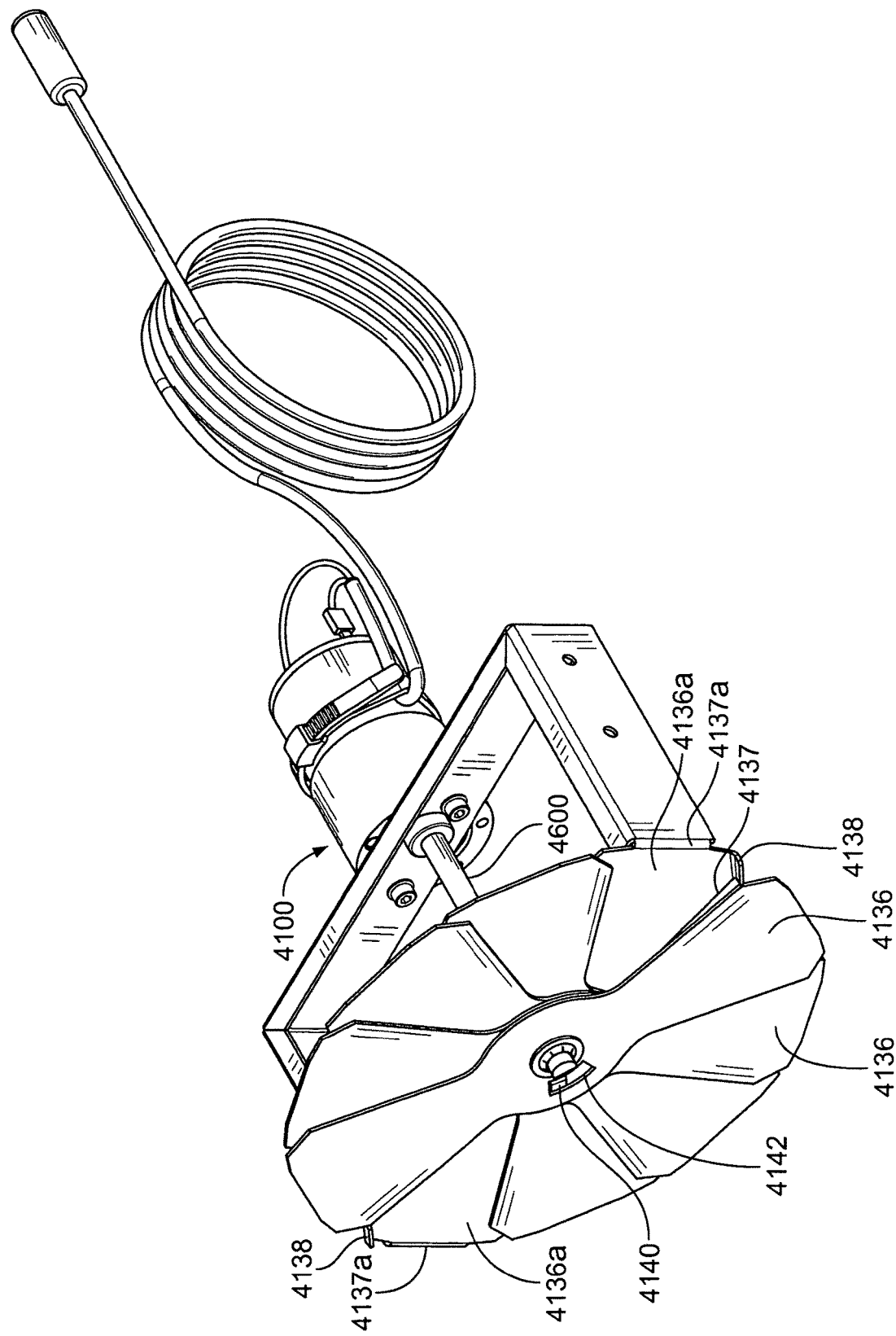
FIG. 15 is an isometric view of an alternative embodiment of the rotary damper shown in the system of FIG. 12.

Referring to FIGS. 14 and 15, a preferred embodiment of a damper system is shown that provides a continuous indication of the relative position and direction of rotation of the damper between the open and closed positions. Controller 4102 is provided with a display 4123 comprising a series of LEDs that provide a graphic representation of the position of the damper 4000 between the open and closed positions. In a particularly preferred embodiment, display 4123 is a linear array of LEDs 4124a-4124z that provide a continuous sequence of indicia corresponding to the relative position of the damper between the open and closed positions. For example, when the damper is in the fully open position, actuating controller rocker switch 4106 at position 4106b causes damper 4000 to rotate toward the closed position and causes display 4123 to show a first indicia in which the first LED 4124a in the linear array turns green. As the rotation of damper 4000 progresses to the closed position, display 4123 sequentially shows a second indicia in which LEDs 4124*a* and 4124*b* are green, a third indicia in which LEDs 4124*a* through 4124*c* are green, etc. This sequence of indicia continues until the damper reaches the fully closed position and all of LEDs 4124*a* through LED 4124*z* are turned on. The number of green LEDs 4124 shown in display 4123 thus provides a continuous indication of the position of damper 4000 relative to the open and closed positions during the operation of the damper. To indicate that damper 4000 is in the fully closed position and rotation has stopped, last LED 4124*z* may turn red rather than green.

To open damper 4000, rocker switch 4106 is actuated at position 4106*a* and the operation of display 4123 is reversed with LEDs 4124 sequentially turning green beginning with LED 4124*z* until LED 4124*a* is reached and turns red, indicating that the damper is in the fully open position and has stopped rotating. The direction of rotation is readily determined by observing whether LEDs 4124 are turning green from "a to z" direction (closing) or the "z to a" direction (opening), or by observing whether LED 4124*a* or LED 4124*z* has turned red.

Continuous display 4123 provides a fast and reproducible method of balancing airflow without the repeated use of an airflow meter. Once the airflow of a plenum system has been balanced, the relative position of each damper in the system may be recorded as the number of green/red LEDs 4124 shown in display 4123. If the system is later adjusted, the balance is easily restored without the need for an airflow meter, by resetting the dampers to their appropriate positions as indicated by the number of the number of green/red LEDs 4124. This ability to quickly and reproducibly reset the balance is particularly useful where there is a need for periodic adjustment of the airflow, such as between seasons. Thus, continuous display 4123 provides a distinct advantage over conventional damper systems which do not provide any indication of the position of the damper between the open and closed positions, or that may only provide a rough indication of the midpoint position.

As shown in FIG. 14, display 4123 comprises ten LEDs 4124. However, those of skill in the art will appreciate that display 4123 may comprise any number and/or arrangement of LEDs 4124. For example, in the case of a rotary damper, it may be desirable to arrange LEDs 4124 in a circular pattern to reflect the configuration of the damper. In a preferred embodiment, an even number of LEDs 4124 are used, to accurately represent the midpoint between the open and closed positions.

The position of damper 4000 between the open and closed positions may be determined using microprocessor 1114, as shown in FIG. 10. For example, using a constant speed motor 4100, microprocessor 1114 can be programmed to determine the position of damper 4000 based on the time of rotation. If a gear and coupling system is required, such as system 1000 shown in FIG. 9, the known gear ratio of worm gear 1300 and planetary gear 1400 may also be taken into account when calculating the position of damper. Microprocessor 1114 then directs display 4123 to provide the proper indication of the position of the damper by turning on the appropriate LEDs 4124.

In some cases, the overrotation of damper 4000 past the fully open or closed position may create errors when time of rotation is used to determine the position of the damper. Thus, damper 4000 preferably incorporates a mechanism to prevent overrotation. As shown in FIG. 15, rotary damper 4000 comprises a number of blades 4136 that rotate relative to each other about a common axis (i.e. drive shaft 4600), thereby defining a blade rotation plane. Typically, only a single blade is directly connected to and driven by the drive shaft 4600. The rotation of all of blades 4136 is coordinated by one or more pins 4140 that travel within corresponding slots 4142. As blades 4136 reach the fully open or fully closed position, slot 4142 restricts the movement of pin 4140 which, in turn, restricts the relative rotation of the blades.

In some cases, a manually driven cable or a motor 4100 may provide sufficient torque to force pin 4140 out of slot 4142, permitting the overrotation of blades 4136 beyond the fully open or fully closed positions. In a preferred embodiment, one or more flanges 4138 are formed at the edge 4137 of blade 4136*a*. Flanges 4138 project orthogonally to the blade rotation plane and form a stop that restricts the rotation of the other blades 4136 beyond edge 4137 and, consequently, restricts overrotation. In a particularly preferred embodiment, flanges 4138 are positioned at the end of the blade 4137*a* furthest from the axis of rotation to minimize any gaps between the blades in the fully closed position and to increase the resistance to torque.

While various embodiments have been described, it will be apparent to those of ordinary skill in the art that many more embodiments and implementations are possible within the scope of the invention. Accordingly, the invention is not to be restricted except in light of the attached claims and their equivalents.

What is claimed is:

1. A damper system for controlling airflow through a plenum, comprising:
   a damper within the plenum, the damper rotatable between a first position permitting maximum airflow and a second position restricting airflow to a minimum;
   a motor for rotating the damper between the first and second positions;
   a controller for operating the motor;
   an electrical connector for connecting the controller to the motor, comprising a plug and a jack for receiving the plug, the jack having a body; and
   a wall plate for mounting the electrical connector remotely from the motor, comprising first and second plates, wherein the body of the jack is secured between the first and second plates, the first plate having a housing sized and shaped to receive the body of the jack and the second plate having a well that is sized and shaped to receive the housing;
   and wherein the jack is removably secured in the wall plate by fitting the housing in the well.

2. The damper system of claim 1 wherein the well has a flexible flange that defines an opening that is smaller than the body of the jack, and wherein the body of the jack is removably secured in the housing by snap fit insertion through the opening.

3. The damper system of claim 2, wherein the flexible flange has an interior surface that defines the opening, and the interior surface is inclined to facilitate insertion of the body of the jack through the opening.

4. The damper system of claim 3, wherein the interior surface further comprises a sharply inclined lip to increase the difficulty in withdrawing the body of the jack through the opening.

5. The damper system of claim 1, wherein the second plate is coupled to the first plate by friction fit.

6. The damper system of claim 1, further comprising a cable connecting the jack to the motor, and wherein the well has a first opening sized and shaped to receive the housing, a second opening that is sized and shaped to receive the cable, and a slot connecting the first and second openings that is sized and shaped to receive the cable.

7. The damper system of claim 1, wherein the second plate has an exterior surface with at least one rib for securing the wall plate to a wallboard structure by press fit in the wallboard.

8. The damper system of claim 1, further comprising an opening in the first plate, the housing positioned to correspond to the opening and the conductor of the jack accessible to receive the plug through the opening.

9. The damper system of claim 8, wherein the wall plate further comprises a cover plate for concealing the opening.

10. The damper system of claim 9, wherein the cover plate is formed integrally with the front plate.

11. The damper system of claim 1, wherein the first plate has a plurality of housings and the second plate has a corresponding number of wells for mounting a plurality of electrical connectors.

12. The damper system of claim 11, further comprising a plurality of openings in the first plate, each housing positioned to correspond to an opening, and the jack accessible for connection to the plug through the opening.

13. The damper system of claim 12, further comprising a plurality of indicia adjacent each opening on the first plate for identifying the jack secured in the corresponding housing.

14. A damper system for controlling airflow through a plenum system, comprising:
   first and second dampers within the plenum system, the first and second dampers rotatable between a first position permitting maximum airflow and a second position restricting airflow to a minimum;
   first and second motors for respectively rotating the first and second dampers between the first and second positions;
   a controller including a power supply for operating the first and second motors, an electrical plug coupled to the controller;
   first and second electrical jacks respectively coupled to the first and second motors, the first and second jacks configured to receive the plug; and
   a wall plate for mounting the first and second jacks on a building structure, the wall plate comprising first and second plates, wherein the first and second jacks are removably secured between the first and second plates, the first plate configured to be fastened to the building structure and having first and second housings that are sized and shaped to respectively receive the first and second jacks, each housing having a first opening, and wherein the first and second jacks are accessible to the plug through the first openings; and
   the second plate having first and second wells that are sized and shaped to respectively receive the first and second housings, each well having a flexible flange defining a second opening that is smaller than the first and second jacks, and wherein the first and second jacks are removably secured in the wall plate by respectively fitting the first and second housings in the first and second wells and snap fit insertion of the first and second jacks through the second openings.

15. The damper system of claim 14, wherein the flexible flanges have an interior surface that defines the second openings, and the interior surface is inclined to facilitate insertion of the first and second jacks through the second openings.

16. The damper system of claim 15, wherein the interior surface further comprises a sharply inclined lip to increase the difficulty in withdrawing the first and second jacks through the second openings.

17. The damper system of claim 14, wherein the second plate is coupled to the first plate by friction fit.

18. The damper system of claim 14, wherein the wall plate further comprises a cover plate for concealing the first openings.

19. A wall plate for mounting an electrical connector in an opening of a wall, the wall plate comprising first and second plates, and a bracket, the first plate having a housing sized and shaped to receive the electrical connector, the second plate having a well that is sized and shaped to receive the housing and wherein the electrical connector is removably secured within the wall plate by fitting the housing in the well, the bracket having a flange extending into the opening of the wall to secure the bracket to the wall, and wherein the first plate is secured to the bracket.

20. The wall plate of claim 19, wherein the well has a flexible flange that defines a well opening, and wherein the electrical connector is removably secured in the housing by snap fit insertion through the well opening.

21. The wall plate of claim 19, wherein the electrical connector is a jack connected to a cable.

\* \* \* \* \*